US011204907B2

(12) United States Patent
VanderSpek et al.

(10) Patent No.: US 11,204,907 B2
(45) Date of Patent: Dec. 21, 2021

(54) ACCELERATED AND MEMORY EFFICIENT SIMILARITY MATCHING

(71) Applicant: Exagrid Systems, Inc., Marlborough, MA (US)

(72) Inventors: Adrian T. VanderSpek, Worcester, MA (US); Luis Arruda, Wrentham, MA (US); Jamey C. Poirier, Grafton, MA (US); Stephen A. Smith, Bedford, NH (US); Raz Zieber, Westborough, MA (US); Peter Watkins, Newton Center, MA (US)

(73) Assignee: Exagrid Systems, Inc., Marlborough, MA (US)

( * ) Notice: Subject to any disclaimer, the term of this patent is extended or adjusted under 35 U.S.C. 154(b) by 74 days.

(21) Appl. No.: 16/704,798

(22) Filed: Dec. 5, 2019

(65) Prior Publication Data
US 2021/0173821 A1    Jun. 10, 2021

(51) Int. Cl.
G06F 16/00       (2019.01)
G06F 16/22       (2019.01)
G06F 16/2455    (2019.01)
G06F 16/215     (2019.01)

(52) U.S. Cl.
CPC ........ G06F 16/2255 (2019.01); G06F 16/215 (2019.01); G06F 16/24568 (2019.01)

(58) Field of Classification Search
CPC ........... G06F 16/2255; G06F 16/24568; G06F 16/215
See application file for complete search history.

(56) References Cited

U.S. PATENT DOCUMENTS

| 8,412,848 | B2 | 4/2013 | Therrien et al. |
| 9,703,707 | B2 | 7/2017 | Falsafi et al. |
| 10,067,946 | B2 | 9/2018 | Vanderspek et al. |
| 2009/0300321 | A1 | 12/2009 | Balachandran et al. |
| 2011/0196838 | A1* | 8/2011 | Zunger ................. G06F 16/182 707/636 |
| 2012/0158672 | A1 | 6/2012 | Oltean et al. |
| 2012/0233417 | A1 | 9/2012 | Kalach et al. |
| 2013/0046949 | A1* | 2/2013 | Colgrove ............. G06F 3/0659 711/170 |
| 2018/0081561 | A1* | 3/2018 | Todd .................... G06F 11/1453 |
| 2021/0019232 | A1* | 1/2021 | Murti .................. G06F 16/1748 |

* cited by examiner

Primary Examiner — Diedra McQuitery
(74) Attorney, Agent, or Firm — Mintz Levin Cohn Ferris Glovsky and Popeo, P.C.

(57) ABSTRACT

A method, a system, and a computer program product for performing accelerated and memory efficient similarity matching. A data stream having a plurality of data zones is received. Each zone includes a zone identifier. A plurality of hashing values for each zone are generated. Each hashing value is generated based on a portion of a zone. A storage structure having a plurality of storage containers is generated. Each storage container stores one or more hashing values associated with each respective storage container and a plurality of zone identifiers referencing the associated hashing values. At least one storage container includes a listing of zone identifiers stored in each storage container. Using the storage structure, the received data stream is deduplicated.

24 Claims, 22 Drawing Sheets

FIG. 13

| Structure | Increase in Memory Consumption | Issues |
|---|---|---|
| std::map< uint32_t, std::set< uint32_t> > | 16.69:1 | very high increase in memory consumption |
| std::unordered_map< uint32_t, std::vector< uint32_t> > | 8.66:1 | high increase in memory consumption |
| array of key,value tuples | 1.27:1 | Random insert, delete extremely slow |
| Hybrid with array and map | 2.12:1 up to 6.37:1 | May require periodic compaction. Requires a sorted map |

| Num referrers | 1_ref key | 1_ref value | X_ref key | X_ref value |
|---|---|---|---|---|
| 0 | - | - | - | - |
| 1 | e-hash | zoneID + N + 1 | - | - |
| X (1 < X <= N) | e-hash | X | e-hash | array of X zoneIDs |

FIG. 20

| Measurement | Existing Systems | Current Subject Matter System | Improvement |
|---|---|---|---|
| Memory use increase | Up to 6.67:1 | 1.58:1 | Up to 75% less memory |
| Random lookup performance | 1050 nS | 57 nS | 18 times faster |
| Insert performance | 1240 nS | 644 nS | 1.9 times faster |

ACCELERATED AND MEMORY EFFICIENT SIMILARITY MATCHING

TECHNICAL FIELD

In some implementations, the current subject matter relates to data processing, and in particular, to accelerated and memory-efficient similarity matching of backup data.

BACKGROUND

Many information technology ("IT") operations and activities can be scheduled to run one or more times within some periodic cycle (daily, weekly, monthly, quarterly, etc.). One such application can be data backup. Data backups can be essential to preserving and recovery of data in the event of data loss, for example. To avoid interfering with daily user activities, data backups can be performed during periods of low application server utilization, typically, on weeknights and on weekends. The backup job workload can be the same or different depending on how much data needs to be protected and when. In some applications, backup jobs can be scheduled and/or configured using a commercial backup application, an operating system shell scripting, and/or in any other manner.

Backup applications employ a plurality of techniques to manage data designated for backup, which may include, for example, deduplication, delta-compression, data-compression, etc. However, conventional backup systems implement mechanisms that tend to consume a significant amount of compute power, storage bandwidth, and storage capacity, thereby increasing operational costs and reducing efficiency of networks and data storage facilities. Thus, there is a need for an improved accelerated and memory-efficient backup of data.

SUMMARY

In some implementations, the current subject matter relates to a computer implemented method for accelerated and memory-efficient similarity matching of backup data. The method may include receiving a data stream having a plurality of data zones, wherein each zone may include a zone identifier, generating a plurality of hashing values for each zone in the plurality of zones. Each hashing value may be generated based on a portion of a zone. The method may also include generating a storage structure having a plurality of storage containers. Each storage container in the plurality of storage containers may store one or more hashing values in the plurality of hashing values associated with each respective storage container and a plurality of zone identifiers referencing the associated hashing values. At least one storage container may include a listing of zone identifiers stored in each storage container. The method may further include deduplicating, using the storage structure, the received data stream.

In some implementations, the current subject matter can include one or more of the following optional features. Each container may be configured to store a metadata identifying each one of the one associated one or more hashing values.

In some implementations, each plurality of zone identifiers stored in each storage container in the plurality of containers may be a fixed number of zone identifiers (e.g., X). Further, the plurality of storage containers may be a predetermined number of storage containers (e.g., N).

In some implementations, each container may be configured to store a zone identifier data determined based on the zone identifier referencing the associated one or more hashing for that container and the predetermined number of storage containers.

In some implementations, the method may include retrieving a zone identifier in the plurality of zone identifiers referencing a hashing value in the plurality of hashing values. The retrieval may be performed based on the listing of zone identifiers stored in each storage container in the plurality of storage containers and a number of storage containers.

In some implementations, the method may also include inserting a new zone identifier and a new corresponding hashing value referencing the new zone identifier. The insertion may be performed based on a determination whether the new corresponding hashing value is stored in one or more storage containers in the plurality of storage containers. Upon determination that the new corresponding hashing value is not stored in the one or more storage containers, the new zone identifier and the new corresponding hashing value may be encoded using a number of storage containers and stored in at least one storage container. Upon determination that the new corresponding hashing value is stored in the one or more storage containers, the new zone identifier may be encoded using the number of storage containers and stored in the storage container storing the new corresponding hashing value.

In some implementations, the method may include deleting a zone identifier in the plurality of zone identifiers referencing a hashing value in the plurality of hashing values. The deletion may be performed based on the listing of zone identifiers and hashing values stored in each storage container in the plurality of storage containers and a number of storage containers.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 13 illustrates a chart containing a summary comparison of the memory consumption ratios, performance and complexities of the above four exemplary implementations;

FIG. 16 illustrates an exemplary chart summarizing storage of the e-hash reference counts, including encoding of e-hash key-value information for storage in the in-memory structure shown in FIG. 15;

FIG. 20 illustrates an exemplary chart illustrating comparison of conventional systems to the current subject matter system;

DETAILED DESCRIPTION

To address these and potentially other deficiencies of currently available solutions, one or more implementations of the current subject matter provide methods, systems, articles or manufacture, and the like that can, among other possible advantages, provide for accelerated and memory-efficient similarity matching of backup data.

Figure 1:
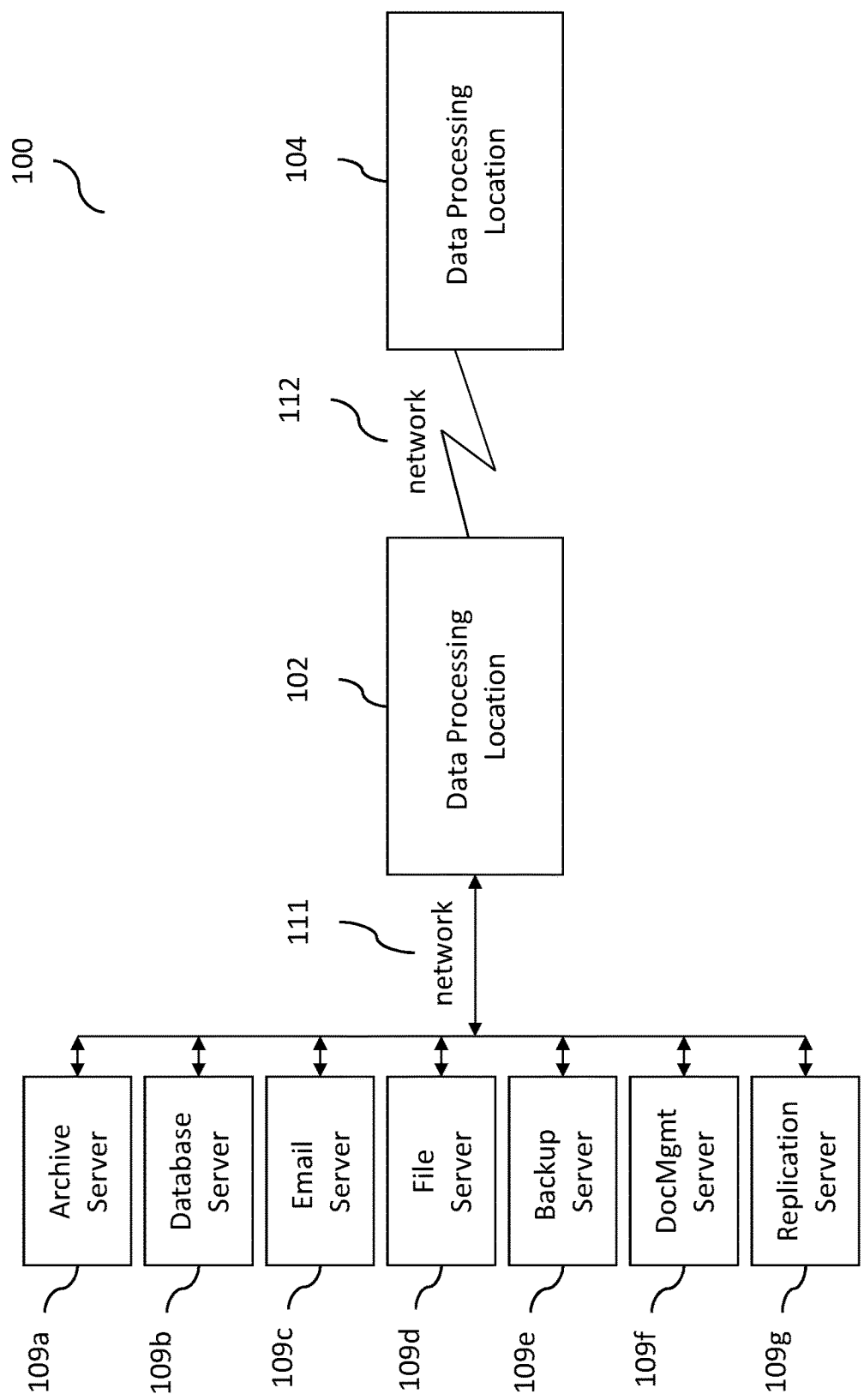
FIG. 1 illustrates an exemplary environment where the current subject matter's accelerated and memory efficient similarity matching processes may be implemented, according to some implementations of the current subject matter.

In some implementations, as stated above, the current subject matter relates to systems, methods, devices, and/or computer program products for performing similarity matching of backup data that may be performed as part of deduplication, delta-compression, data-compression and/or other backup-related processes. Deduplication and compression of backup data workloads may provide significant cost savings to organizations (e.g., organizations running applications 109 as shown in FIG. 1 and discussed below) by reducing an amount of data that may need to be stored in local storage systems (e.g., system 102 as shown in FIG. 1) as well as an amount of data transmitted to disaster recovery storage systems (e.g., remote systems, such as system 104 shown in FIG. 1). However, such deduplication processes may be extremely compute and input/output (I/O) intensive, which in turn, increases time (e.g., to perform a backup, retrieve, etc.), total cost of ownership, etc. of systems running these processes. As such, optimizations that may increase the deduplication ratio, accelerate execution time of the deduplication algorithm, and/or any other aspects of the backup processes may be highly beneficial. In some implementations, the current subject matter may provide optimization of the backup processes resulting in a significant acceleration of the speed of deduplication processes (e.g., 18× faster random lookup, 1.9× faster insertion), while also reducing memory consumption (e.g., more than 75% of reduction of memory consumption associated with conventional systems).

In a deduplication process, unique chunks (e.g., chunks, zones, e-chunks, etc. as will be discussed below) of data, or byte patterns, may be identified, analyzed, and later stored. During deduplication, delta compression processes may be performed, which may include determination of differences and/or delta encoding between various data (e.g., subsequent, similar, and/or any other versions of data). This may allow for more efficient and/or quicker storage and/or transmission of data between various nodes in a computing system. The determined differences (or deltas) between files, rather than complete files, may be stored/transmitted. In typical applications (as shown in FIG. 1 for example) such as backup, archiving, etc., delta compression may consume significant amounts of CPU (central processing unit) that may be located within data processing location 102, memory and I/O (input/output) resources, and thus slow down performance of a computing system.

FIG. 1 illustrates an exemplary environment where the current subject matter's accelerated and memory efficient similarity matching processes may be implemented. In particular, FIG. 1 illustrates an exemplary system 100 for processing (e.g., deduplicating, storing, etc.) one or more streams of data received from a variety of sources 109 (a, b, c, d, e, f, g). The source 109 can include an archive server 109a, a database server 109b, an email server 109c, a file server 109d, a backup server 109e, a document management server 109f, a replication server 109g, as well as any other application, business object, business process, business process application, server, software, hardware, etc. The system 100 may further include data processing locations 102, 104 and networks 111, 112. The network 111 may communicatively couple the data processing location 102 and source 109 and the network 112 can communicatively couple the data processing location 102 and the data processing location 104. In some implementations, the data processing location 102 may be located in the same physical location as the sources 109. Alternatively, the data processing location 102 may be remote from the sources 109. The data processing location 104 may be remotely located from the sources 109 and/or data processing location 102. For example, the data processing location 104 may be a recovery site for the data received from the source 109.

The data processing locations 102 and/or 104 may include one or more computing devices, systems, servers, hardware, software, and/or any combination of hardware and/or software, which may be communicatively coupled with one another using various wireless and/or wired connections, networks, etc. The networks 111, 112 may be any wireless and/or wired networks, wide area networks ("WAN"), metropolitan area networks ("MAN"), local area networks ("LAN"), Internet, extranet, intranet, as well any other type of network.

In some embodiments, the data processing location 102 may receive data stream(s) from sources 109 and may perform an initial processing (e.g., deduplication, delta-compression, data compression, analysis, etc.) of the received data. Additionally, the data processing location 102 may also perform retrieval of data, when requested to do so by source(s) 109. The data may be stored in a storage local to the data processing location 102 (not shown in FIG. 1). The data may be sent to data processing location 104 and stored in a storage local to the data processing location 104 (not shown in FIG. 1). For example, critical application data may be stored at a local facility (e.g., as represented by the data processing location 102) and/or at a geographically distant remote facility (e.g., as represented by the data processing location 104) in order to provide for a full recovery in the event of system failure, site disaster, or any other unprecedented condition or event.

In some implementations, the current subject matter, e.g., implemented in the system 100 shown in FIG. 1, may process backup data streams and apply a multi-level (e.g., a two-tiered) deduplication process to reduce backup data storage capacity, inter-data center network bandwidth, etc. Exemplary process for executing multi-level deduplication are illustrated in co-owned U.S. Pat. No. 9,703,707 to Therrien et al., issued on Jul. 11, 2017, and entitled "Multi-Level Deduplication" and U.S. Pat. No. 10,067,946 to Vanderspek et al., issued on Sep. 4, 2018, and entitled "Next-level Multi-level Deduplication", the disclosures of which are incorporated herein by reference in their entities.

Figure 2:
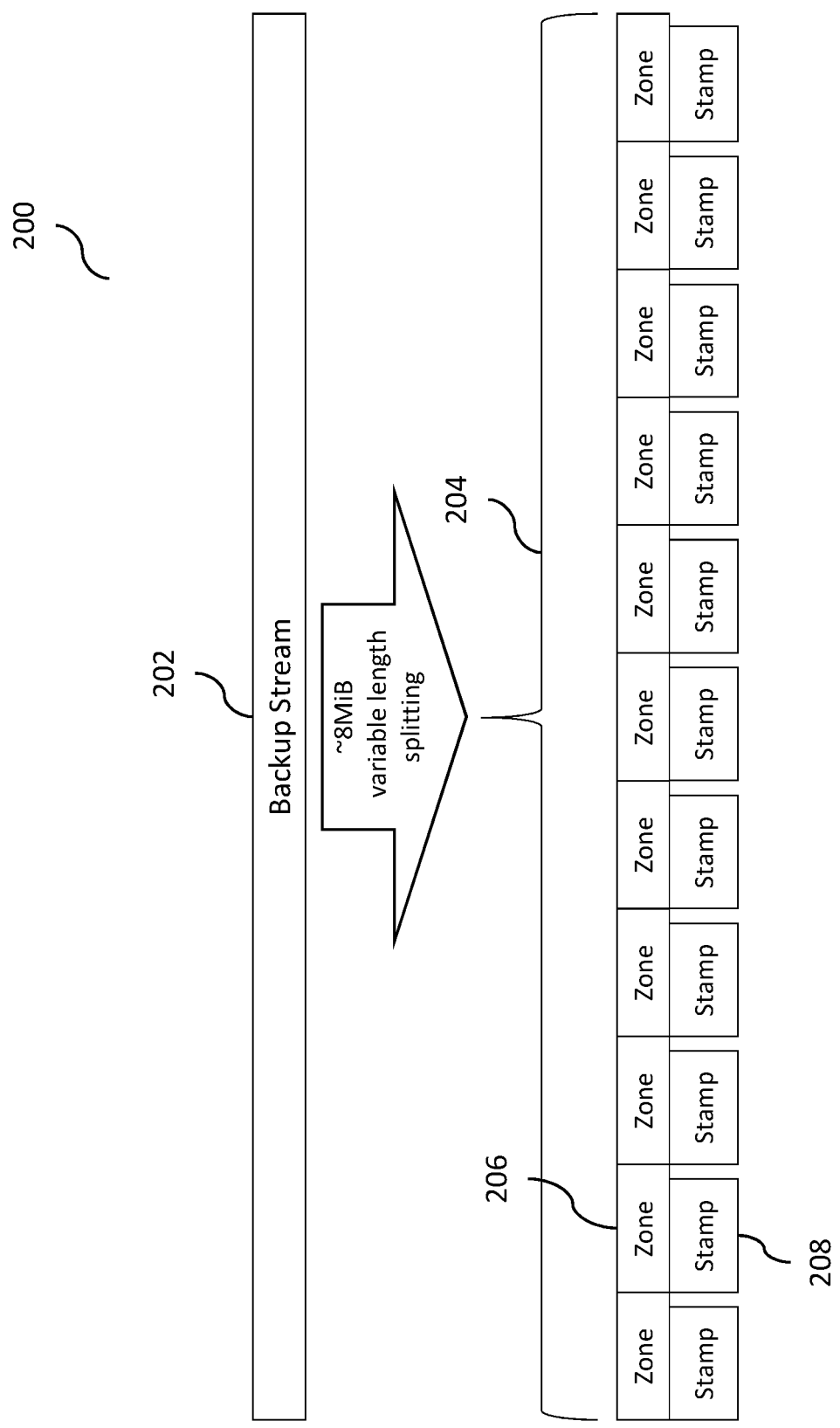
FIG. 2 illustrates an exemplary backup process, including splitting a backup stream into in a plurality of zones and generating corresponding zone stamps/match information, according to some implementations of the current subject matter.

FIG. 2 illustrates an exemplary backup process 200, including splitting a backup stream into in a plurality of zones and generating corresponding zone stamps/match information, according to some implementations of the current subject matter. The process 200 may be performed by the system 100 shown in FIG. 1. During the process 200, an incoming backup stream 202 may be received by a deduplication appliance (e.g., appliance 102 shown in FIG. 1). The stream 202 may then be split into a variable size zones 204 (e.g., the zones may have a variable length but not exceeding approximately 8 MiB or any other size (e.g., an exemplary, non-limiting target range of sizes of zones may be in a range of approximately 8 MiB to 100 MiB and/or any other values). Splitting of the stream 202 into zones 204 may also include generation of a match information for each zone (e.g., generated zone 206 may have a match information or stamp 208). The match information may be used to search and/or identify existing zones that may be similar to any new zones contained within incoming backup streams 202.

Figure 3:
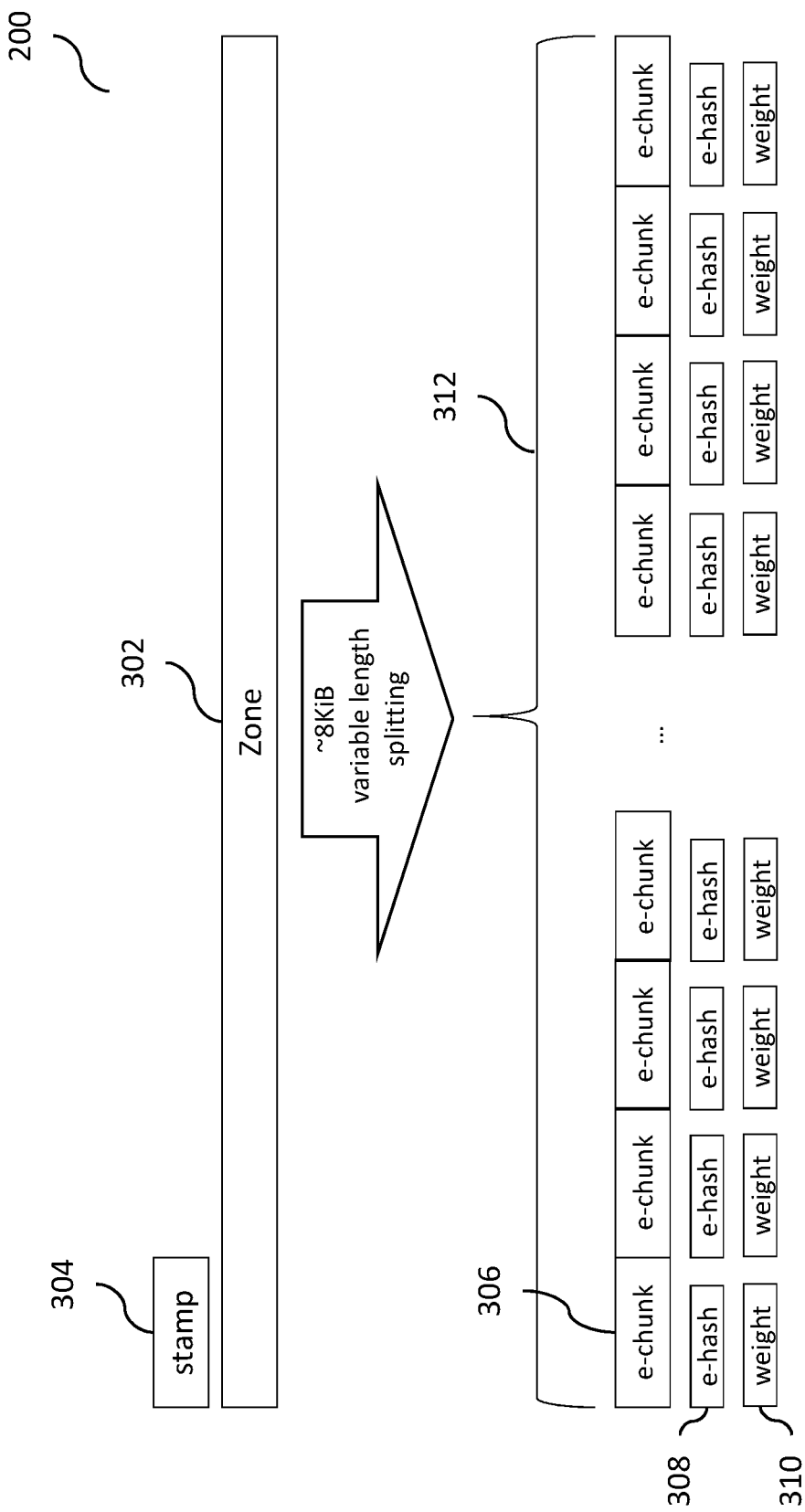
FIG. 3 illustrates an exemplary process for further splitting zones generated in FIG. 2 into further chunks, according to some implementations of the current subject matter.

FIG. 3 illustrates an exemplary match information that may be generated during process 200 (shown in FIG. 2) and that may be used to search for similar zones, according to some implementations of the current subject matter. During the deduplication process 200, a zone stamp 304 may be generated for each variable size zone 302 (e.g., zones 206 shown in FIG. 2). An exemplary zone stamp generation process is illustrated in the co-owned U.S. Pat. No. 8,412,848 to Therrien et al., issued on Apr. 2, 2013, and entitled "Method And Apparatus For Content-Aware And Adaptive Deduplication", the disclosure of which is incorporated herein by reference in its entirety.

In some implementations, each zone may also split into variable length data chunks or "e-chunks" 312 (by way of a non-limiting example, each e-chunk may be approximately 8 KiB (e.g., the target size of the e-chunk may be 8 KiB with a minimum of 2 KiB and a maximum of the remainder of the zone.) Further, each such e-chunk 304 in the plurality of e-chunks 312 may have an associated hash value or "e-hash" 308. In some exemplary, non-limiting implementations, e-hash 308 may be generated using any known hashing algorithm, such as, for example, a CRC32 algorithm. CRC32 algorithm may generate concise 32-bit hashes, thereby minimizing memory consumption. The CRC32-based hashing may be one of the fastest hashes that may be computed. This is an important aspect of this hashing process, as thousands of hashes may be computed for each zone. The lowest-valued 8% of these hashes may be used for multi-level deduplication and/or similarity detection processes. (As can be understood, any percentage of hashes may be used, where an exemplary, non-limiting value of 8% was experimentally selected as an optimal compromise between catalog size and matching accuracy, as for example, explained in U.S. Pat. No. 10,067,946 to Vanderspek et al., issued on Sep. 4, 2018, and entitled "Next-level Multi-level Deduplication", the disclosure of which is incorporated herein by reference in its entirety).

In some implementations, a corresponding weight value 310 for each e-chunk 304 may be also generated. The weight may correspond to the byte length of the e-chunk 304. In some cases, the same e-hash 308 may appear more than once in a zone, then the e-hash weight 310 may be determined as the sum of all e-chunk lengths that it represents in that zone.

Figure 4:
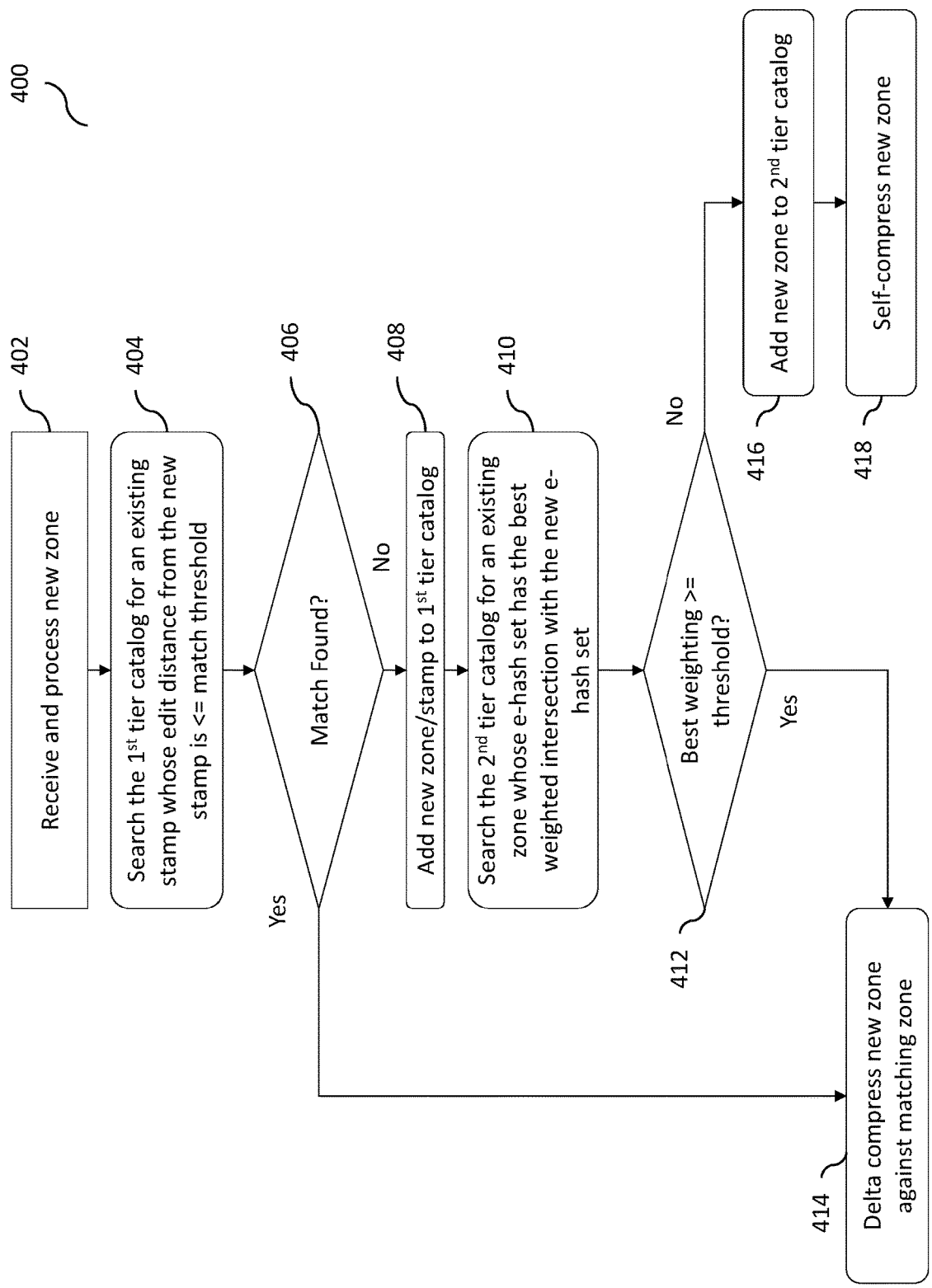
FIG. 4 illustrates an exemplary process for performing multi-level deduplication, according to some implementations of the current subject matter.

FIG. 4 illustrates an exemplary process 400 for performing multi-level deduplication, according to some implementations of the current subject matter. In particular, it illustrates processing of a new zone having a corresponding zone stamp, e-hashes and weights, as described above in connection with FIG. 3. As shown in FIG. 4, the process 400 may be performed for the first level/tier and second level/tier deduplication. The process may be performed utilizing catalogs of zone stamps (e.g., tables, virtual tables, etc.) that may be generated at each such tier (generation and use of such catalogs are illustrated in co-owned U.S. Pat. No. 9,703,707 to Therrien et al., issued on Jul. 11, 2017, and entitled "Multi-Level Deduplication" and U.S. Pat. No. 10,067,946 to Vanderspek et al., issued on Sep. 4, 2018, and entitled "Next-level Multi-level Deduplication", the disclosures of which are incorporated herein by reference in their entities).

At 402, a new zone may be received and processed, whereby its stamp, e-hash and weight values may be generated/determined. The zone stamp generated for the new zone may be generated for the purposes of first tier deduplication processes and the e-hash and weight values may be used for the purposes of second tier deduplication processes.

At 404, using the zone's zone stamp, a search of the first tier deduplication may be executed to identify an existing zone having a similar zone stamp. This process may be referred to as a first tier match lookup. In some implementations, to ascertain a match or a similarity among zone stamps (and hence, zones), an edit distance for a zone stamp may be determined and compared to a predetermined edit distance match threshold. If the edit distance for the zone stamp is less than or equal to the predetermined match threshold (at 406), then the new zone corresponding to that zone stamp may be delta-compressed against an existing matching zone (i.e., an already stored zone), which means that favorable delta compression ratio may be obtained.

However, if at 406, a match is not found (i.e., the edit distance of the generated zone stamp is greater than the predetermined match threshold value, the computed zone stamp may be added to the first tier catalog, at 408, for possible future matches with subsequently processed zones. The deduplication process 400 may then proceed to the next level of deduplication (e.g., second tier deduplication), where the zone, as received and processed at 402, is assessed against the second tier catalog of zone stamps.

Figure 5:
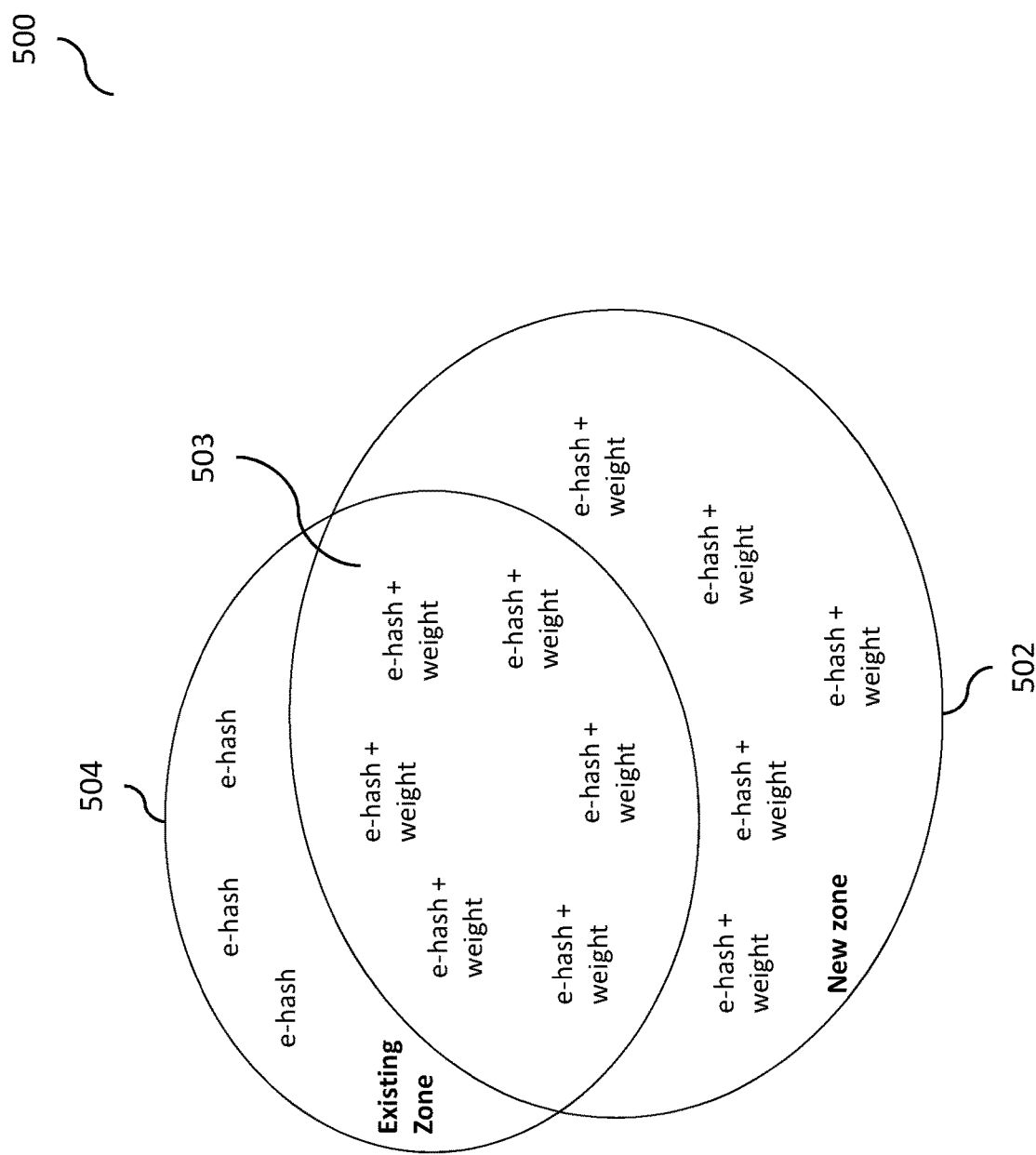
FIG. 5 is a diagram illustrating exemplary intersection of different zone e-hash and weight values.

At 410, the second tier catalog of zone stamps may be searched using e-hash and weight values that have been determined for the new zone. The catalog may be searched for an existing zone whose e-hash set has the best weighted intersection with the new zone's e-hash set. FIG. 5 is a diagram 500 illustrating such exemplary intersection 503 of different zone e-hash and weight values (e.g., values for the new zone 502, as received at 402, and values for existing zone(s) 504). In some exemplary implementations, a second-tier match lookup may be performed using the lowest-valued 8% of the new zone's 502 e-hash values and their corresponding weight values and the lowest-valued 5% of e-hash values for each existing zone 504. The e-hash values from the existing zone 502 may be compared to the e-hash values from the new zone 402. E-hash values that are in both the existing zone's set and the new zone's set comprise intersection 503 of the two sets. The weight values for these e-hash values for the new zone may be summed to determine the weighted intersection of the two sets. All weighted intersections for all zones may be determined and the existing zone with the best weighted intersection may be found. If, at 412, the best weighted intersection is greater than or equal to a predetermined threshold size (e.g., 1% of the size) of the new zone, the existing zone with the best weighted intersection may be considered a match and the new zone may be delta-compressed against that existing zone, at 414.

If the accumulated weighting does not exceed the predetermined threshold size (e.g., less than 1% of the new zone size), at 412, then the new zone may be added to the second tier catalog, at 416. Then, the new zone may be data-compressed, at 418. Alternatively, or in addition to, the process may repeat itself using further tiers of zone stamp catalogs (e.g., $3^{rd}$ tier, etc.).

In some implementations, information that may be required for performing match lookups may be stored/maintained in a main memory of a deduplication system (e.g., as shown in FIG. 1), whereby, information for the first tier lookups may be stored in the first tier zone stamp catalog data structure, and information for second tier lookups may be stored in the second tier zone stamp catalog data structure. The second tier (or any other tier) catalog may be configured as an in-memory data structure.

Figure 6:
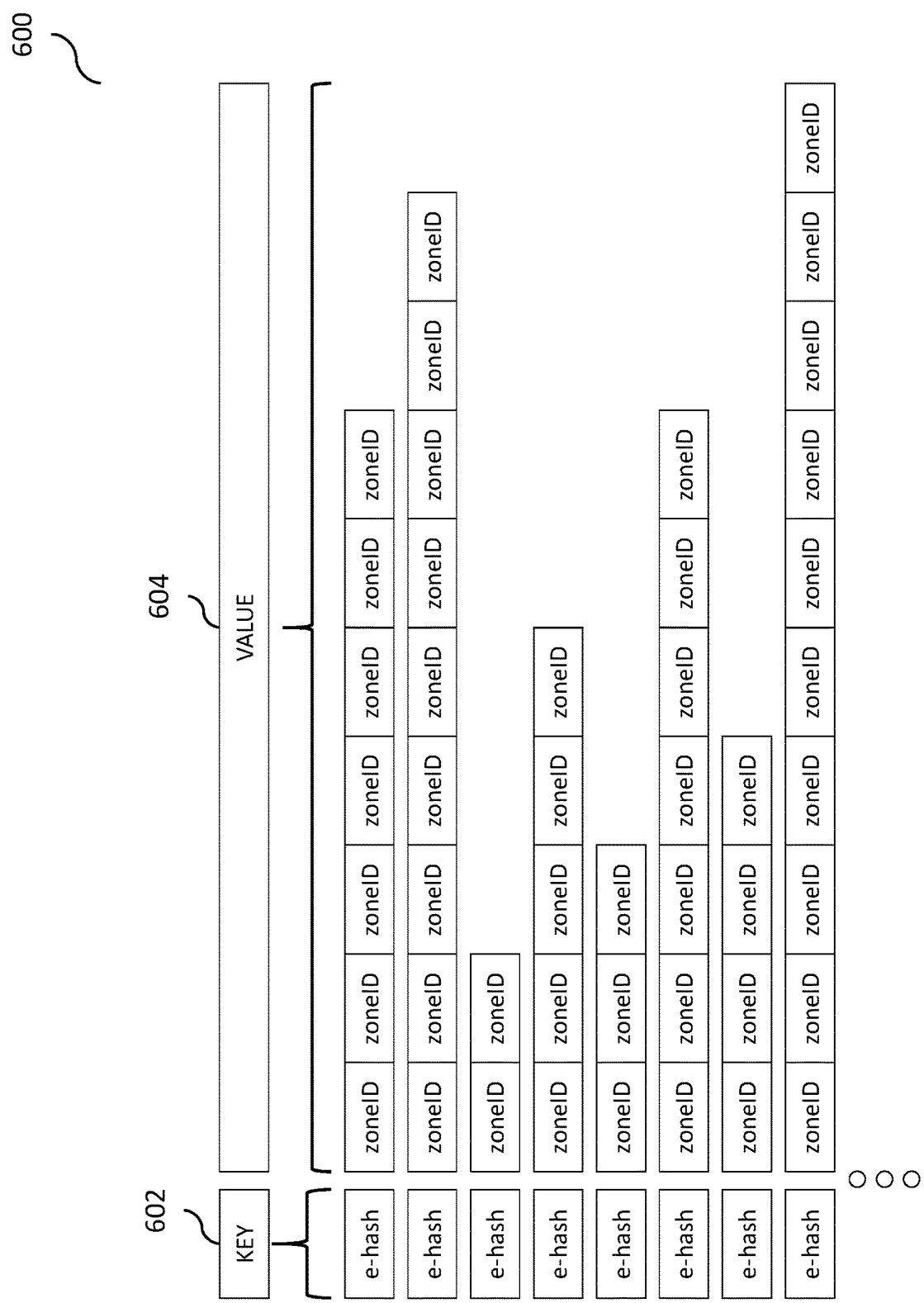
FIG. 6 illustrates an exemplary virtual structure and/or schema that may be used for a catalog (e.g., a second-tier catalog), according to some implementations of the current subject matter.
Figure 7:
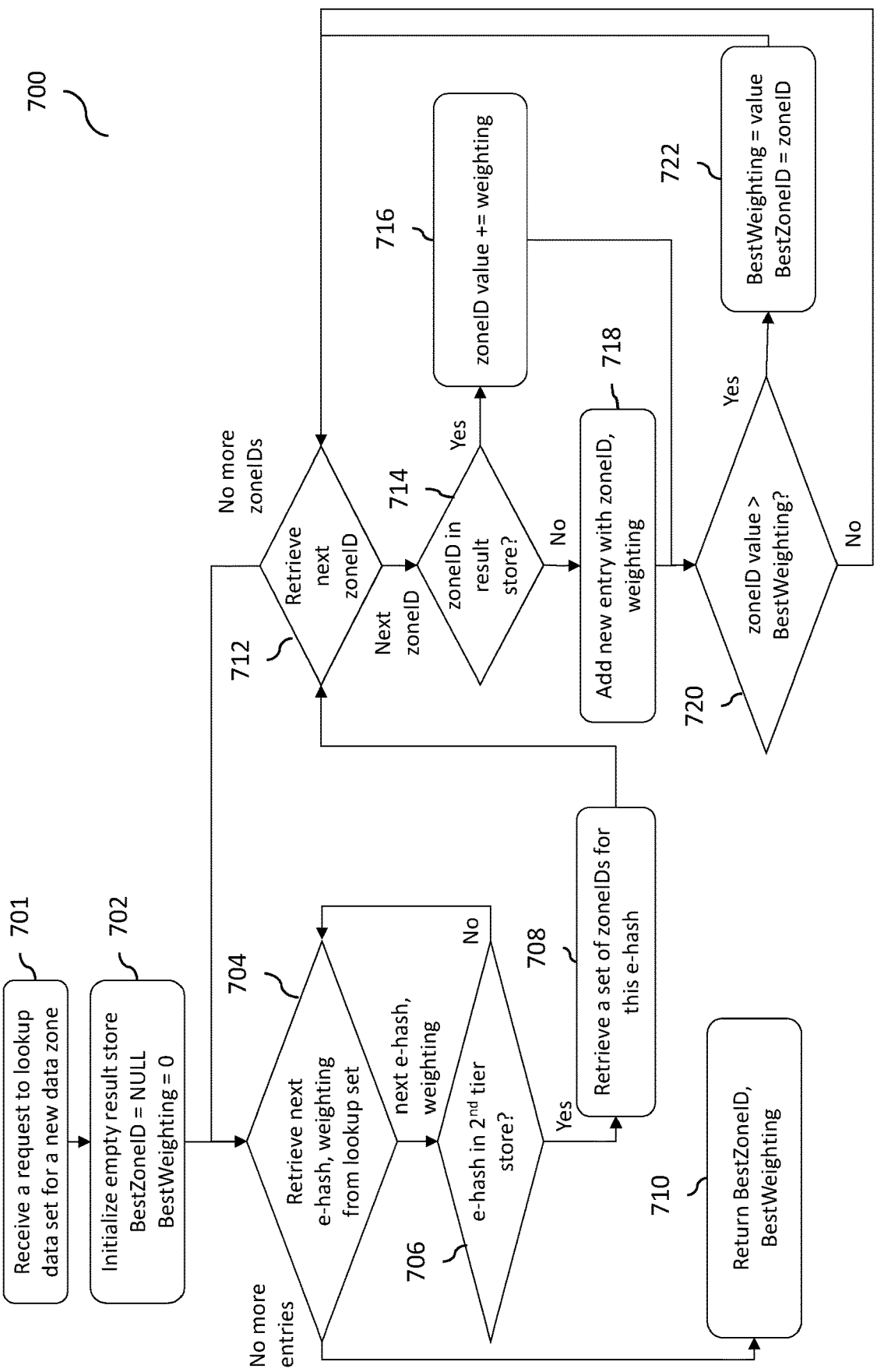
FIG. 7 illustrates an exemplary process for executing a lookup function.
Figure 8:
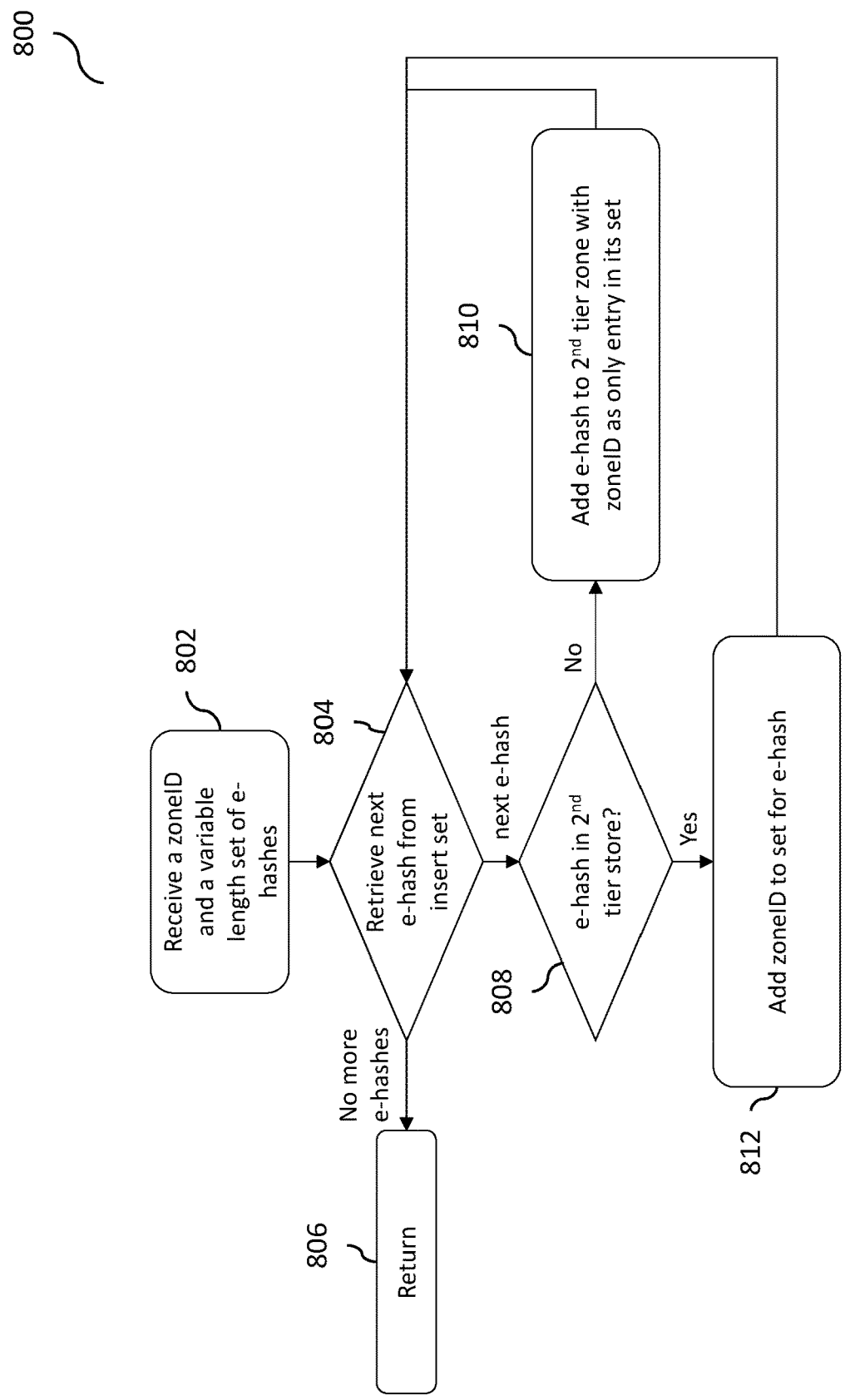
FIG. 8 illustrates an exemplary process for executing an insert function.
Figure 9:
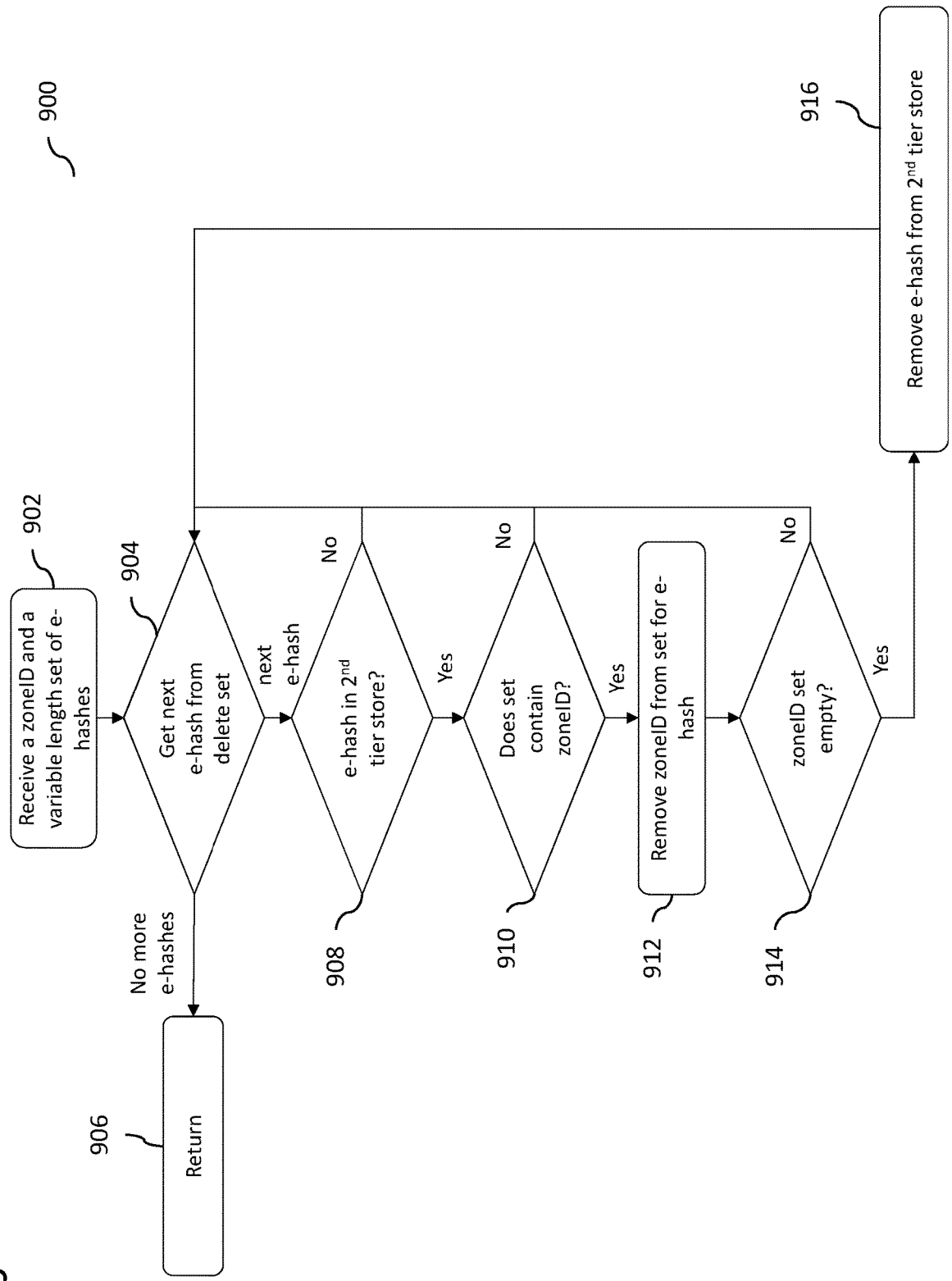
FIG. 9 illustrates an exemplary process for executing a delete function.

FIG. 6 illustrates an exemplary in-memory structure, virtual structure and/or schema 600 that may be used for a catalog (e.g., a second-tier catalog), according to some implementations of the current subject matter. The structure 600 may be configured as a key-value store data structure having key portions 602 and value portions 604. As can be understood by one skilled in the art, other ways of implementing the in-memory structure 600 are possible (as for example, shown in and discussed in connection with FIGS. 10-12 below). As shown in FIG. 6, the key portion 602 may include one or more e-hash values and the value portion 604 may include corresponding variable length sets of zones that contain that e-hash. Using the key:value structure 600 shown in FIG. 6, the second-tier zone stamp catalog may be configured to support at least one of the following functions: lookup, insert, delete, and/or any combination thereof, and/or any other functions. It should be noted that the structure 600 may be implemented in connection with any other catalog, virtual memory schema, data structure, etc. It may also be implemented to perform any other functions besides lookup, insert, delete, etc. The lookup function may be configured to allow search and retrieval of certain data relating to stored zones, such as a zone identifier (zoneID or zone stamps) and weight values (as discussed above). The insert function may be configured add or insert a new zone identifier to the existing list of zoneIDs. The delete function may be configured to allow removal or deletion of a zone identifier from the list of zoneIDs. FIGS. 7-9 illustrates processes 700, 800, 900 for executing the lookup, insert, and delete functions, respectively.

As stated above, FIG. 7 illustrates an exemplary process 700 for executing a lookup function. The lookup function may be executed in connection with retrieval of any data from a memory location, a data storage structure, an in-memory structure, etc. As, for example and ease of illustration, shown in FIG. 7, the process 700 may be performed in connection with execution of a lookup function of the second tier catalog (as can be understood, it may be any other catalog) matching process in order to identify the best-weighted match for a new zone when compared to previously stored zones (or identify any similar zones). As can be understood, the process 700 may be executed for any level or tier of the matching process. The process 700 may be executed by one or more processors and/or memory/storage components of the deduplication system shown in FIG. 1. Prior to execution of the lookup function, the lookup function may receive a request to lookup a data set for a new data zone, at 701. The lookup data set may include a variable length set of e-hashes and corresponding weightings.

At 702, to ensure that correct information is retrieved as a result of the execution of the process 700, parameters of BestWeighting and BestZoneID, may be used to identify a data zone being sought in response to the execution of the lookup function, may be initialized to NULL or 0 values. In some implementations, the lookup function may generate a temporary in-memory "results" key-value store, where each key is a zoneID and each value corresponds to the weighted intersection between that zone's lookup set and a new zone's lookup set.

At 704, subsequent to the initialization of the BestWeighting and BestZoneID values, the lookup function may be configured to determine whether there are remaining e-hash and weighting values in the lookup set. If so, the lookup function process 700 may be configured to iterate through all e-hashes in the lookup set. If e-hash is not contained in the second tier catalog store, at 706, then the process may return to 704 and the next e-hash, weighting values may be processed.

If there are no more e-hashes left to process in the lookup set, at 702, then the process 700 may return a BestZoneID and BestWeighting values, at 710.

If an e-hash is found in the second tier catalog store, a set of zoneID values that refer to that e-hash may be retrieved from the second tier catalog store, at 708. The processing then proceeds to 712, where the each zoneID value in the retrieved set of zoneID values may be analyzed. Each zoneID value is compared to the list of zoneID values that have been already stored in a second tier catalog, at 714. If zoneID value has been already stored, the weighting for the current e-hash may be added to the value for that zoneID value, at 716. If it is not, that zoneID value may be added to the second tier catalog with the weighting for the current e-hash as its value, at 718.

The current value for this zoneID value may then be compared to the BestWeighting value, at 720. If the current zoneID value is greater than the current BestWeighting value, then the BestWeighting value may be set to the current BestWeighting value, and BestZoneID may be set to that zoneID value, at 722. The processing then returns to 712 to analyze the next zoneID value. Further, once all zoneID values for this e-hash are processed, the process 700 may repeat for the next e-hash value from the lookup set.

FIG. 8 illustrates an exemplary process 800 for executing an insert function. Similar to FIG. 7, the insert function may be executed in connection with storage or "insertion of" any data into a memory location, a data storage structure, an in-memory structure, etc. While FIG. 8 illustrates execution of the process 800 in connection with a second-tier catalog or store, it should be noted that the process 800 may be execution in connection with any other type of catalog, data store, virtual memory schema, in-memory structure, etc. At 802, a zoneID and a variable length set of e-hashes may be received for the purposes of executing the insert function. The process 800 may be repeated for each e-hash contained in the set of insert data.

At 804, the next e-hash may be retrieved from the insert data set. If there are no more e-hashes (e.g., after the process 800 has been repeated several times), the process would terminate at 806. Otherwise, for each next e-hash that is retrieved from the insert data set, the e-hash may be looked up in the second tier store, at 808. If the e-hash key is not found in the second tier store, its corresponding zoneID may be added as a new entry with the zoneID as the only referencing zone in its set, 810. If the e-hash key is found, then the zoneID may be added to the set of referencing zones for that e-hash, at 812.

FIG. 9 illustrates an exemplary process 900 for executing a delete function. Again, similar to FIGS. 7-8, the delete function may be executed in connection with deletion of any data from a memory location, a data storage structure, an in-memory structure, etc. and is not limited to the second tier store structure.

At 902, a zoneID and a variable length set of e-hashes may be received for the purposes of deletion. Similar to the execution of the insert function, the delete process 900 may also be configured to iterate through the received set of e-hashes. At 904, the next e-hash from the received set of e-hashes is retrieved for deletion analysis. If there are no more e-hashes (e.g., after the process 900 may have been repeated several times), the process terminates, at 906.

Otherwise, a determination may be made whether the retrieved e-hash is contained in the second-tier store, at 908. If the e-hash is not contained in the second tier store, the process 900 returns to 904, where the next e-hash is retrieved from the delete set.

If the e-hash is present, the process 900 may proceed to determine whether the retrieved e-hash is associated with a zoneID in the set of referencing zones, at 910. If the zoneID is not present, the process 900 may again return to 904 for analysis of the next e-hash in the received set.

If the zoneID is exists, the zoneID may be deleted from the set referring zoneIDs for the retrieved e-hash, at 912. At 914, the process 900 may determine whether zoneID set is for that e-hash is now empty. If not, the processing again returns to 904 for the analysis of the next e-hash in the received delete set. Otherwise, the entire entry for the retrieved e-hash is deleted from the second-tier store and the process 900 may then return to 904 to repeat the process for the next e-hash in the delete set.

Figure 10:
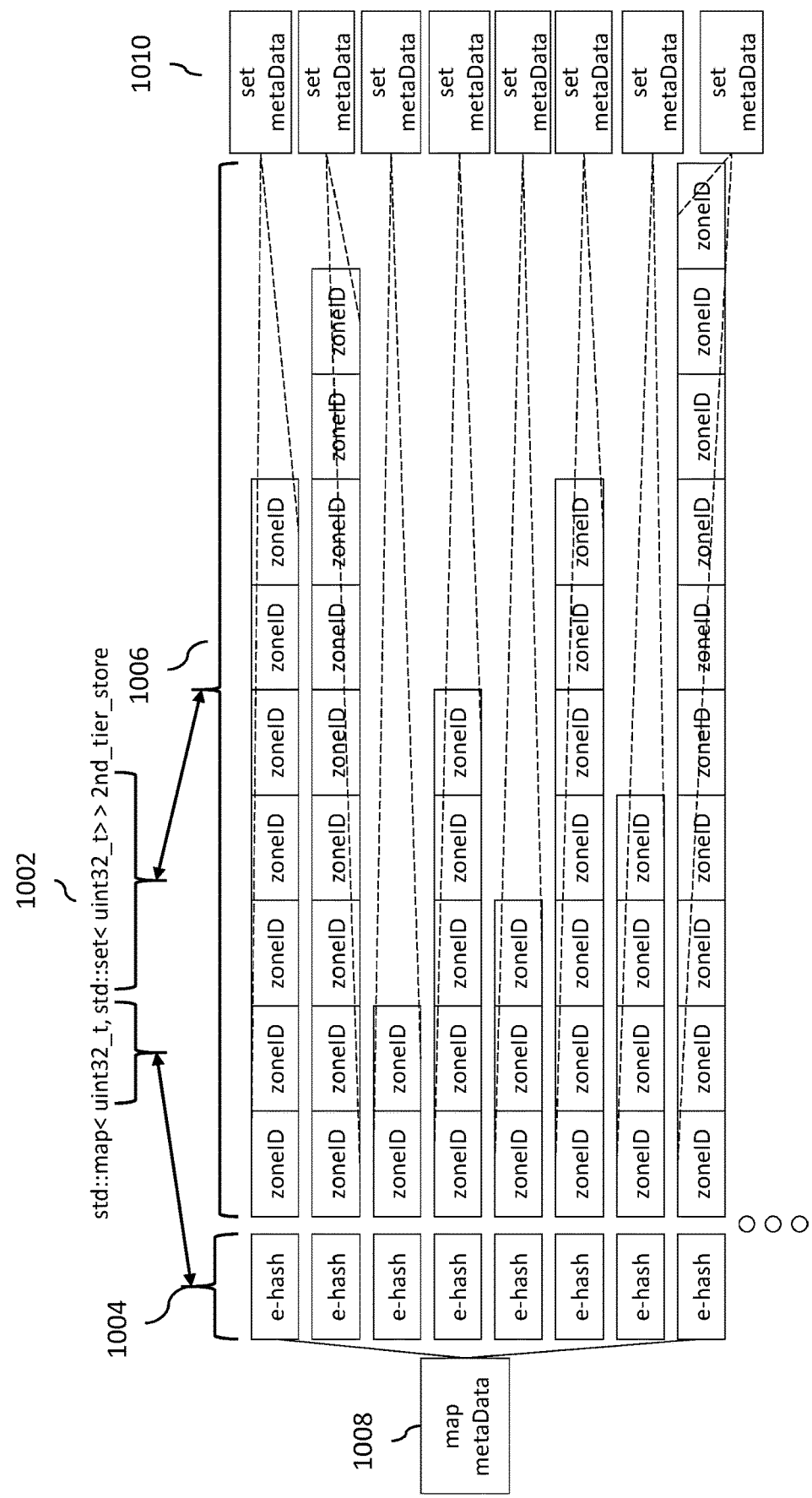
FIG. 10 illustrates an exemplary in-memory structure for a second-tier data store.

In some implementations, the current subject matter may be configured to further provide improvements to in-memory data structures (which, for example, may be used for the second-tier catalog's key:value data store (or any other tier catalog)) so as to improve their performance as well as reduce memory overhead. For ease of illustration and discussion, FIG. 10 illustrates an exemplary implementation of a second-tier data store 1000. The store 1000 may be configured as a key:value store (e.g., a second-tier store) that may include an arrangement of e-hashes (keys) 1004 and zoneIDs (values) 1006. The store 1000 may correspond to C++ standard template library containers implementing the key-value store. The store 1000 may be defined using a C++ definition 10002 (as shown in FIG. 10), which may define a key-value store. The key 1004 may be a 32-bit unsigned integer, and the value 1006 may be a set of unsigned 32-bit integers. The definition 1002 may be configured to match a functionality that may be required for a second-tier store.

However, the "std::map" expression in the definition 1002 may require maintenance of additional map metadata 1008, such as, for tracking its entries and for maintaining a sort order of the e-hash keys 1004. Further, each "std::set" (as defined in the definition 1002) collection of zoneIDs may also require maintenance of set metadata 1010 for tracking and sorting of the value 1006 entries. Hence, the overhead for map metadata 1008 and the set metadata 1010 may consume a significant amount of memory space. For example, to illustrate the consumption of the memory space, a sample test set of e-hashes and zoneIDs was created that may mirror a typical product data. The sample test set included 59.5 million e-hashes referenced by 97.8 million zones. When loaded with this test data set, the implementation shown in FIG. 10 consumed 10.5 gigabytes of main memory. The actual data stored inside the key:value data structures consumed $(59.5+97.8)*10^6*4$ bytes, or 0.629 gigabytes. The increase in memory consumption related to map and set metadata overhead was 10.5/0.629:1, or 16.69:1.

There exist two standard C++ container libraries that are more memory efficient than the std::map structure shown in FIG. 10 to maintain map metadata and the std::set structure to maintain set metadata. For example, the std::unordered_map is a key-value container that uses hashing and storage buckets instead of sorting to track its keys and may be more storage efficient and faster than std::map. Further, the std:: vector is a container that does not sort data and may store data much more efficiently than std::set. To compare performances of the two structure, the same test dataset (as discussed above) was stored in the following container definition:

std::unordered_map<uint32_t,
    std::vector<uint32_t>>

This resulted in 5.45 gigabytes of memory to hold the test data set. The memory increase in memory consumption ratio has improved to being at 5.45/0.629, or 8.66:1 as compared to 16.69:1 in the existing implementation.

Figure 11:
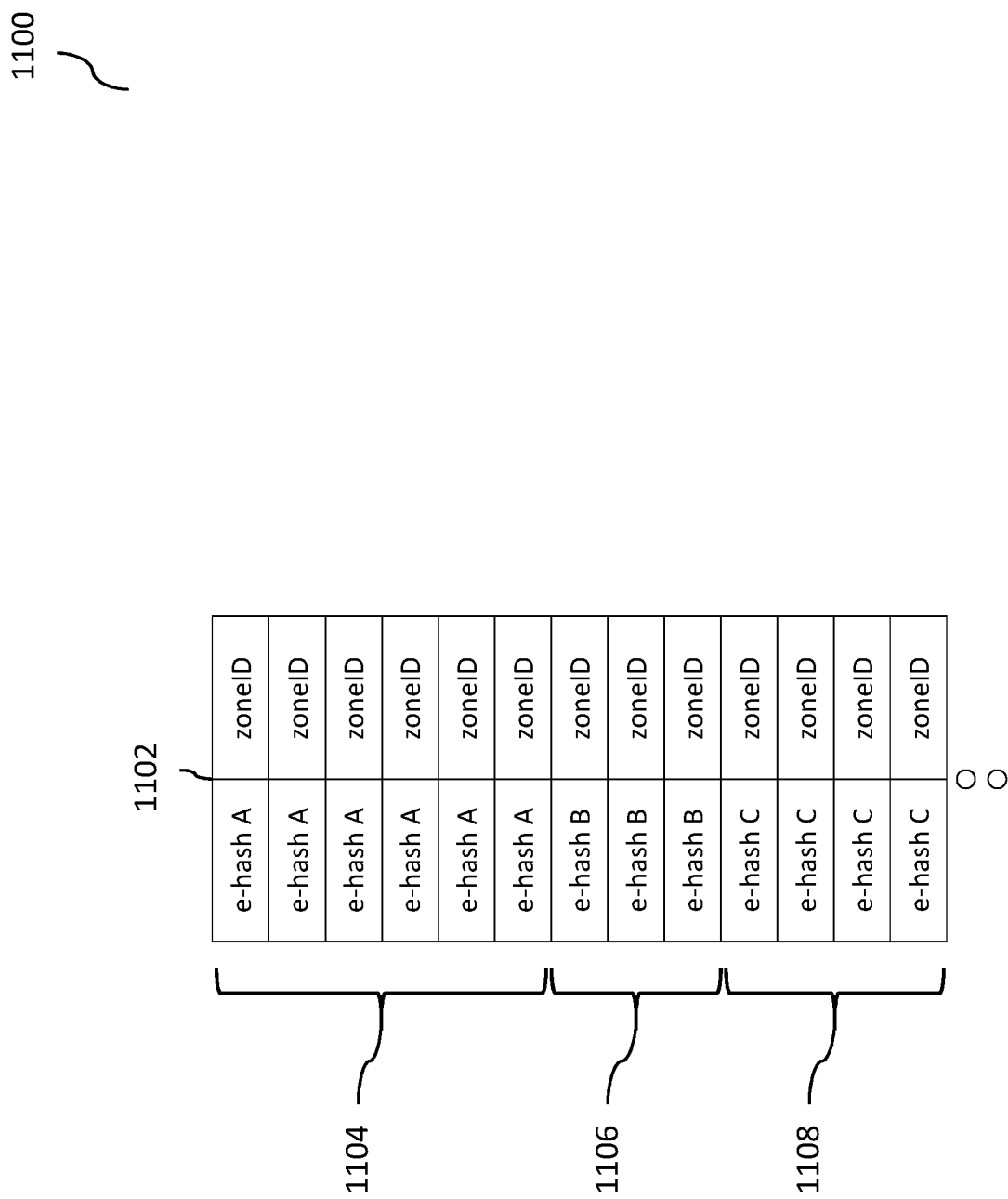
FIG. 11 illustrates an exemplary alternate implementation of an in-memory structure for a second-tier data store for minimizing consumption of memory.

FIG. 11 illustrates an exemplary alternate implementation of a second-tier data store 1100. In the store 1100, the data may be stored in a single large memory array as e-hash and zoneID tuples 1102 and may be sorted by e-hash first, and then zoneID. As shown in FIG. 11, an e-hash A having six zoneIDs may be stored as six tuples 1104, where each tuple may have the same e-hash value and a unique zoneID value. Further, an e-hash B having three zoneIDs may be stored as three tuples 1106 and e-hash C with four zoneIDs may be stored as four tuples 1108. A lookup request may be executed by performing a binary search of the store to find a particular e-hash, and then read all entries with the matching e-hash value to determine a list of zoneIDs referencing that e-hash.

As such, storage of the data in this manner may result in 8 bytes per tuple. The above test data set includes 100 million tuples, which requires 800 million bytes to store the data. This results in an increase in memory consumption of 0.8/0.629, or 1.27:1, illustrating improvement in comparison to previous approaches. However, using this approach, some functions, such as insert and delete of entries (as described above), may require copying all of the data after the point of insertion or deletion, thereby slowing the execution speed.

Figure 12:
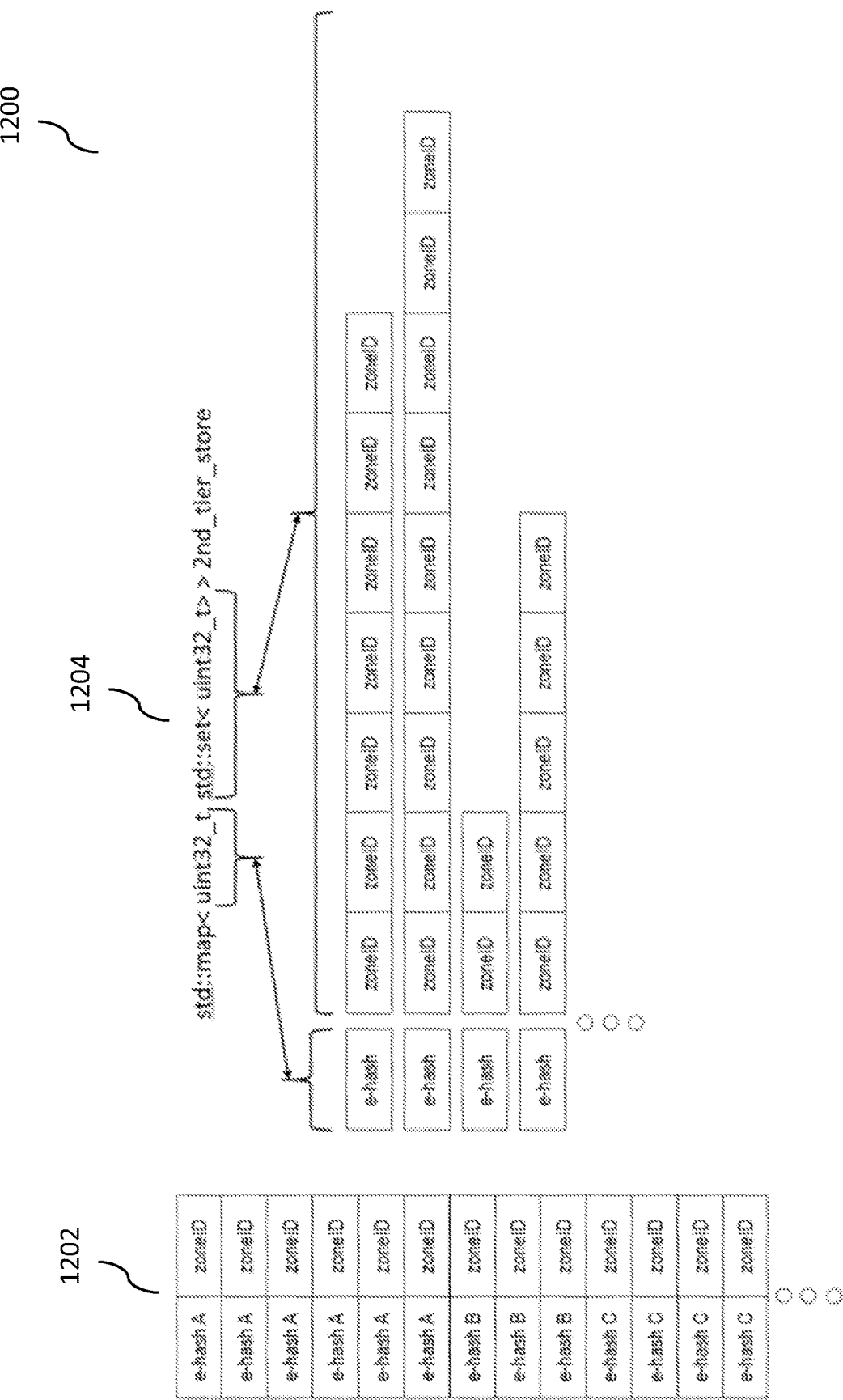
FIG. 12 illustrates a combination of the in-memory structures shown in FIGS. 10 and 11 to store data using a second-tier catalog structure.

FIG. 12 illustrates a combination 1200 of the in-memory structures shown in FIGS. 10 and 11 to store data using a second-tier catalog structure. In particular, the structure 1200 may be configured to include two structures—a primary structure 1202 (similar to structure 1100 shown in FIG. 11) and a secondary structure 1204 (similar to structure 1000 shown in FIG. 10) for storing the data. Most of the data may be configured to be stored using the primary structure 1202, which may maintain e-hash, zoneID tuples in a large array of memory. The secondary structure 1204 may be used for storing any new data. In order to execution a deletion function, deleted entries from the primary structure 1202 may be flagged for later deletion rather than immediately being deleted. Any lookup requests may be executed by searching both the primary and secondary structures 1202 and 1204 and results of the search may then be merged together.

When all of the entries are in the primary structure, the increase in memory consumption ratio is 1.27:1, thereby making this approach more efficient than the previous ones. Over time, old entries may be deleted and new entries may be added. The delete entries may be flagged and not actually deleted or reused. The entries for insertion may be added to the secondary structure 1204. However, this may increase memory consumption.

The percentage of data that may be flagged for deletion in the primary structure 1202 and/or is inserted into the secondary structure 1204 may vary based on a number of factors. For example, typical percentage range may be from 10% to 30% of entries. The above test dataset includes 10% flagged for deletion in the primary structure and flagged for insertion in the secondary structure 1204, corresponding to a memory consumption of 1.34 GB. It should be noted that 30% of the entries deleted from primary structure and inserted in the secondary structure correspond to a memory consumption of 4.00 GB. This resulted in an increase in memory ratio of 2.12:1 to 6.37:1.

FIG. 13 illustrates a chart 1300 containing a summary comparison of the memory consumption ratios for the above four exemplary implementations. The chart 1300 also indicates issues that may be encountered with each implementation. For example, an array of key:value tuples, as discussed above, may have the least memory consumption, however, may have a poor random insert and/or delete performance. Moreover, the second-tier catalog design may also have several drawbacks. When the number of deleted entries grows large, or the number of entries in the secondary structure 1204 (as shown in FIG. 12) grows large, the primary and secondary container structures 1202, 1204 may need to be sort-merged into a new primary container structure. This adds complexity to the overall design of the catalog. Further, the second-tier catalog may be unavailable for lookups while a sort-merge process is being executed. The primary container structure 1202 may only be appended to in a sort order, thereby requiring the secondary container structure 1204 to be a sorted map container, which may consume more memory than a hashed map container.

A Tessil sparse map (as available from https://github.com/Tessil/sparse-map) has been also used and tested for the second-tier catalog data structure. The Tessil sparse map is C++ implementation of a memory efficient hash map and hash set, which uses the following definition:

tsl::sparse_map<uint32_t, std::vector<uint32_t>>second-_tier_store

Testing of this catalog structure resulted in 4.32 gigabytes of memory for holding the test data set. The increase in memory consumption ratio was 4.32/0.629, or 6.87:1. This increase is an improvement over unordered_map's result of 8.66:1, however, it is higher than the range of ratios of 2.12:1 to 6.37:1 for the hybrid design.

Figure 14:
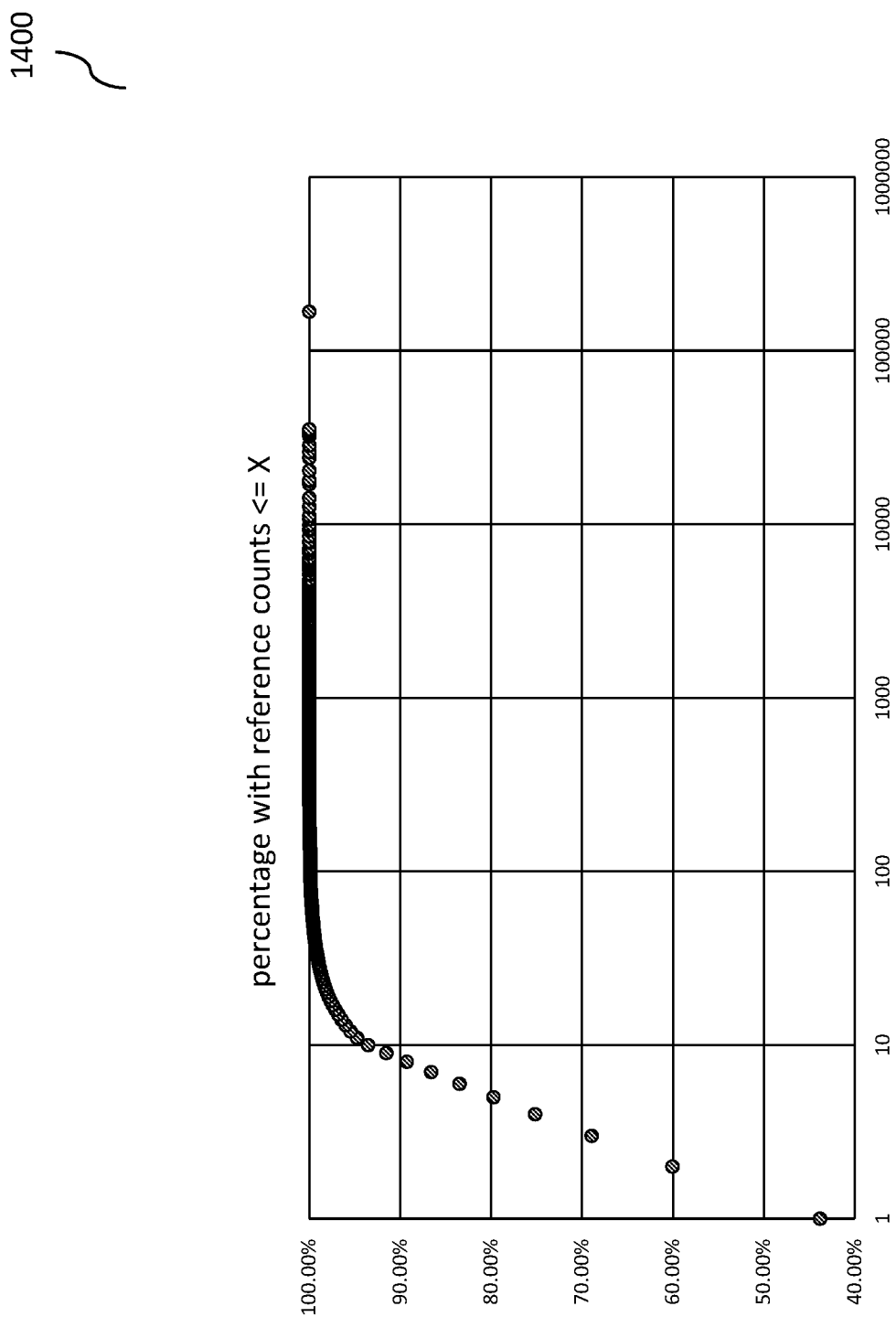
FIG. 14 is an exemplary plot illustrating results of an analysis of second-tier zone stamp catalogs of various data sets performed for the purposes of determining distribution of a number of referring zoneIDs for each e-hash.

FIG. 14 is an exemplary plot 1400 illustrating results of an analysis of second-tier zone stamp catalogs of various data sets performed for the purposes of determining distribution of a number of referring zoneIDs for each e-hash. As shown in FIG. 14, most e-hashes may be associated with only one or two zoneIDs, however, some e-hashes may be associated with thousands of zoneIDs. Most e-hashes (over 99.99%) correspond to 100 or fewer referencing zones.

To address the above, in some implementations, instead of using a single key:value store where the value is a variable size set of zoneIDs, the current subject matter system may implement use of N key:value stores, where the value is a fixed size array of zoneIDs. Hence, the current subject matter may include a plurality of key:value stores for fixed-sizes 1 . . . N. A fixed length array does not require metadata to track its entries, which may significantly reduce any metadata overhead (as for example, is shown in FIG. 10 and discussed above).

Figure 15:
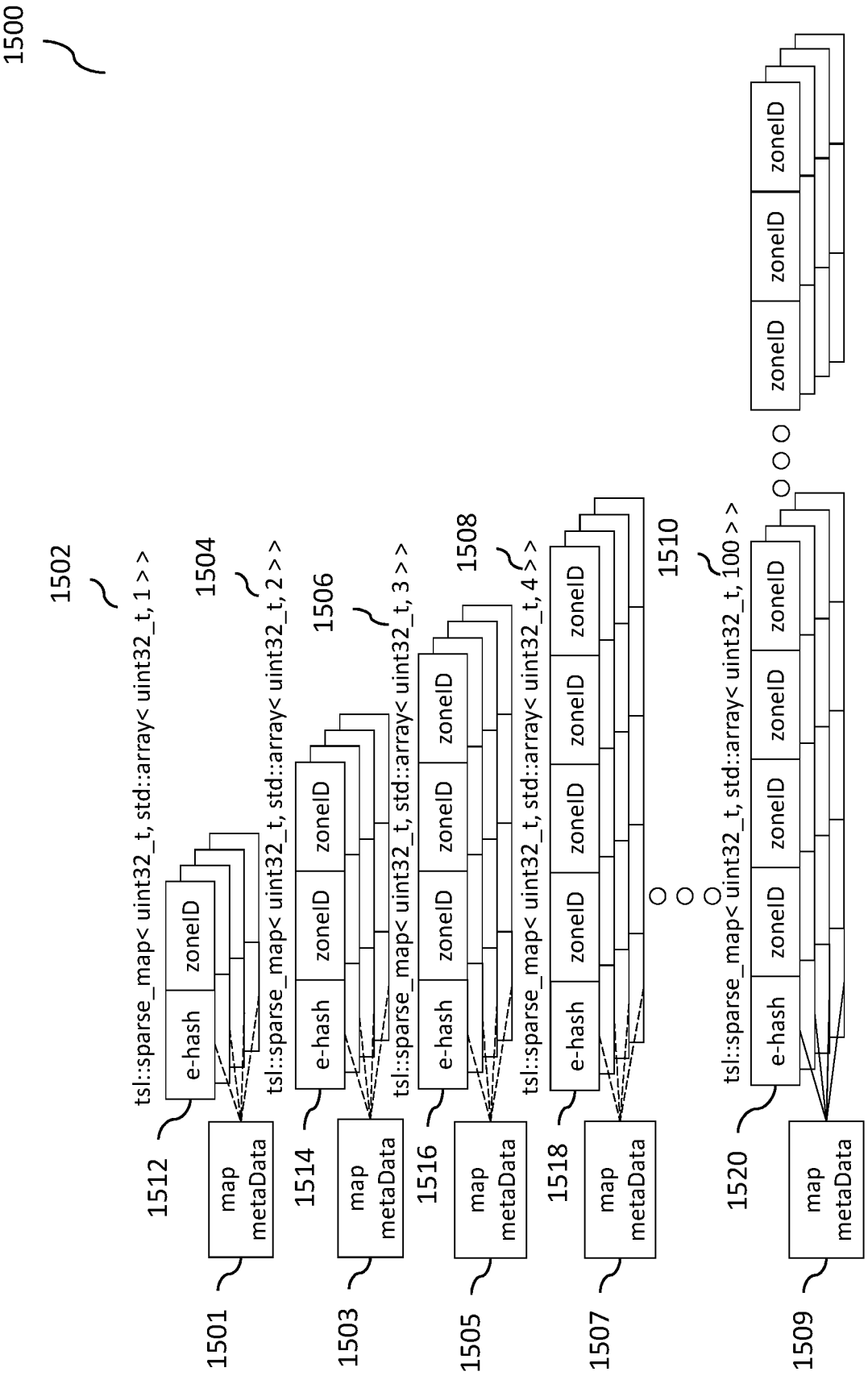
FIG. 15 illustrates an exemplary in-memory structure or system having a plurality of fixed length key:value stores, according to some implementations of the current subject matter.

FIG. 15 illustrates an exemplary in-memory structure or system 1500 having a plurality of key:value stores, according to some implementations of the current subject matter. As shown in FIG. 15, the system 1500 may include a plurality of data store structures 1512-1520. While FIG. 15 illustrates 1 . . . 100 data store structures or containers, one having ordinary skill in the art will understand that the structure 1500 may include any number of data store structures or containers (hereinafter, these terms are used interchangeably). Each data store structure may include a key:value arrangement, where the key is an e-hash value and the value is a fixed size array of zoneID values. Each data store structure 1512-1520, may, for example, be defined by the respective definition 1502-1510, as shown in FIG. 15. Each definition may be in the following format:

tsl::sparse_map<uint32_t, std::array<uint32_t, X>> where X is the array's fixed length. As can be understood, any other ways of defining containers shown in FIG. 15 are possible. The containers may be defined for any type of memory schema, virtual schema, data store, storage structure, etc.

For example, the data store structure 1512 may be defined by the definition 1502 and may include an e-hash value and a single reference array of zoneID values (i.e., X=1); the data store structure 1514 may be defined by the definition 1504 and may include an e-hash value and a double reference array of zoneID values (i.e., X=2); and similarly for other arrays. In some implementations, each of the data stores 1512-1520 may further include a map (e.g., tsl sparse maps) metadata 1501-1509 for tracking its respective contents (e.g., map metadata 1501 may be used to track contents of data store 1512). However, to further conserve memory, no metadata is stored for a std::array. Further, the design of the system 1500 may be such that there is no need to track more than N referencing zoneIDs per e-hash value. Even though some e-hashes have way more referring zoneIDs, not tracking more than N per e-hash may likely have no measurable impact on matching rates. As such, the system 1500 does not need to include a final key:value store with a variable length container for the value to hold all e-hash values with more than N referring zoneIDs. By way of a non-limiting, exemplary implementation, limiting the maximum number of referring zoneIDs to 100 for any given e-hash has no measurable impact on match rates or overall deduplication compression ratios during the backup processes (e.g., as may be performed by the system 100 shown in FIG. 1). Further, in the same non-limiting, exemplary implementation, if an e-hash already has 100 referencing zones, any new zones that reference that e-hash are not added to the list.

In some alternate implementations, the system 1500 shown in FIG. 15 may be configured to have one of the key:value stores 1512-1520 track how many zoneIDs referrers each e-hash may have. This may improve execution of a lookup function. In this case, the lookup function may be executed by initially performing a lookup in the e-hash and zoneID count store to determine how many zoneIDs each e-hash may have. Then, a lookup in the store for that count may be performed to determine a list of corresponding zoneIDs. In some exemplary non-limiting implementations, the 1_reference store (e.g., store structure 1512 shown in FIG. 15) may be used for both storing the zoneIDs for e-hashes with only one reference (i.e., X=1, as discussed above with regard to FIG. 15) as well as for the e-hashes reference count for the remaining e-hashes having more than one referrer (i.e., X>1).

FIG. 16 illustrates an exemplary chart 1600 summarizing storage of the e-hash reference counts. For example, if an e-hash has one referrer (as shown in row 1602, in the number of referrers "Num referrers" column), zoneID+N+1 value may be stored as the value corresponding to the number of zoneIDs in the 1_ref container 1512 (as shown in FIG. 15), where N is the number of X_Ref containers.

Further, if an e-hash has X referrers (where X>1), then the e-hash value with X is stored in the 1_ref container (as shown in row 1604 of table 1600 shown in FIG. 16), and the e-hash, as the X_ref key, and its X length array of zoneIDs, as the X_ref value, are stored in the X_ref container 1606. It should be noted that the current subject matter system may be configured to support any encoding approach that reserves N or more values, whereby adding N+1 to zoneID values, as described above, may be configured to assist in implementation and/or testing. With this encoding approach the single key:value store may contain both the singe entry e-hashes and the number of entries for e-hashes with more than one zoneID. This optimization may allow single entry e-hashes to be stored in only 1 container, which may significantly reduce increase in memory consumption. For example, loading of the second-tier store, in accordance with the above structure, using the above referenced dataset may consume 0.997 GB of memory, whereby 0.997/0.625 result in an increase in memory consumption is 1.58 to 1. As can be understood, other ways of encoding the e-hash values and referrers may exist so that the 1_ref container may be used for both the referrer ID for e-hashes with one referrer as well as a redirection to X_ref containers (X>1) for e-hashes with more than one referrer.

Figure 17:
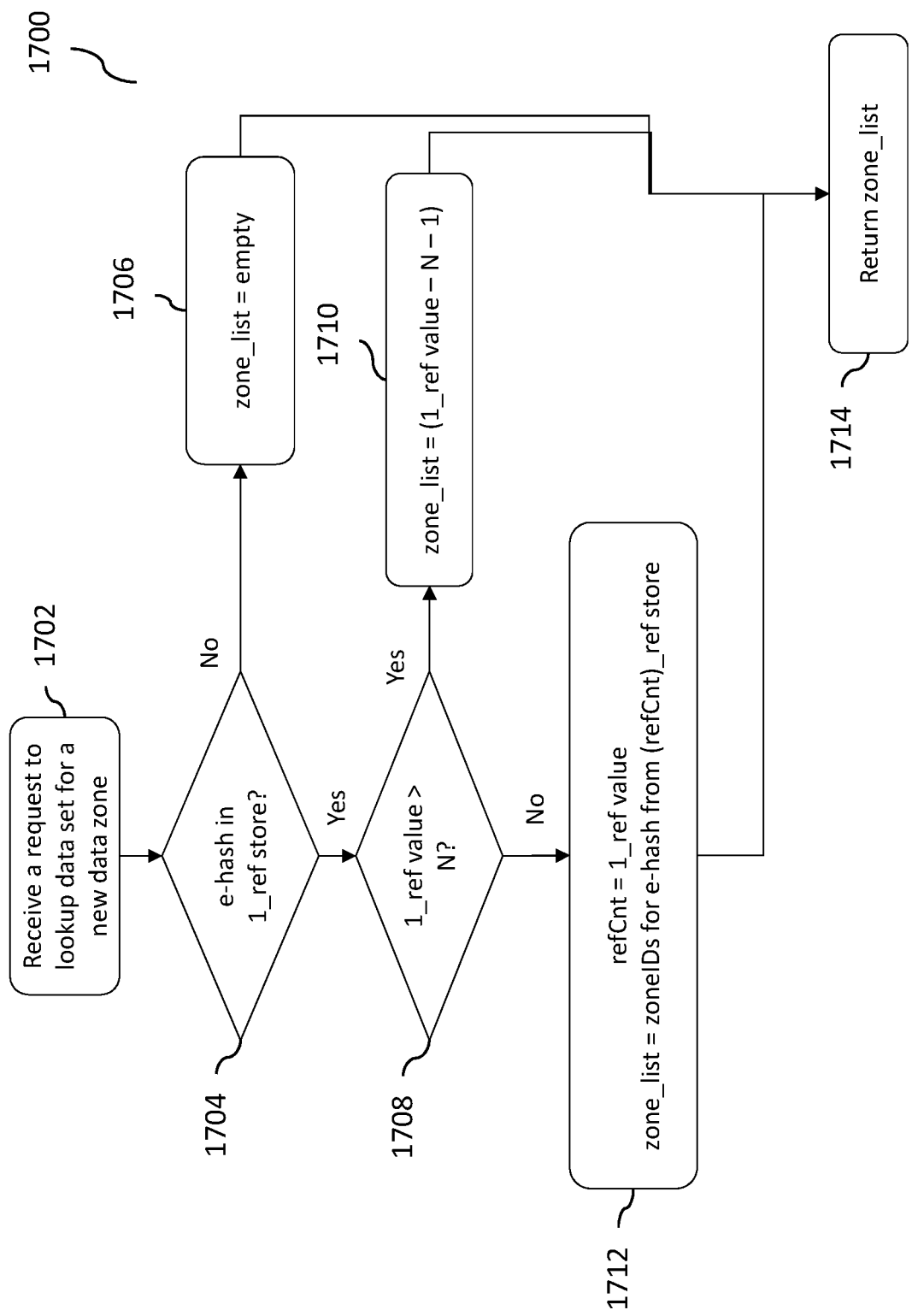
FIG. 17 illustrates an exemplary process for executing a lookup function (for example, using the in-memory structure shown in FIG. 15), according to some implementations of the current subject matter.

FIG. 17 illustrates an exemplary process 1700 for executing a lookup function, according to some implementations of the current subject matter. The process 1700 may be executed using the store structure (as, for example, described above in connection with FIG. 15) to look up a list of zoneIDs that refer to an e-hash value. At 1702, request to perform a lookup data set for a new data zone may be received. At 1704, an e-hash may be looked up in the 1_ref store (e.g., 1_ref store 1512 shown in FIG. 15). If the e-hash value is not in the 1_ref store, the e-hash value is not stored in the second-tier catalog and an empty zoneID list may be returned, at 1706.

However, if the e-hash key is found in the 1_ref store, i.e., an entry for that e-hash key in the 1_ref store exists, its value may be compared to a predetermined value N, at 1708. If the value is greater than the value N, then the e-hash may include only one referrer and its zoneID value would be (1_ref value−N−1), at 1710.

If the 1_ref value is less than or equal to the predetermined value N, then that value may correspond to the number of referrers to the identified e-hash. The e-hash may then be used to look up its corresponding count in the reference count store (i.e., in refCnt store, where refCnt=1_ref value), and a list of referring zoneIDs (i.e., zone_list) may be ascertained and copied from its array of zoneIDs, at 1712. The list of zones may then be returned, at 1714.

Figure 18:
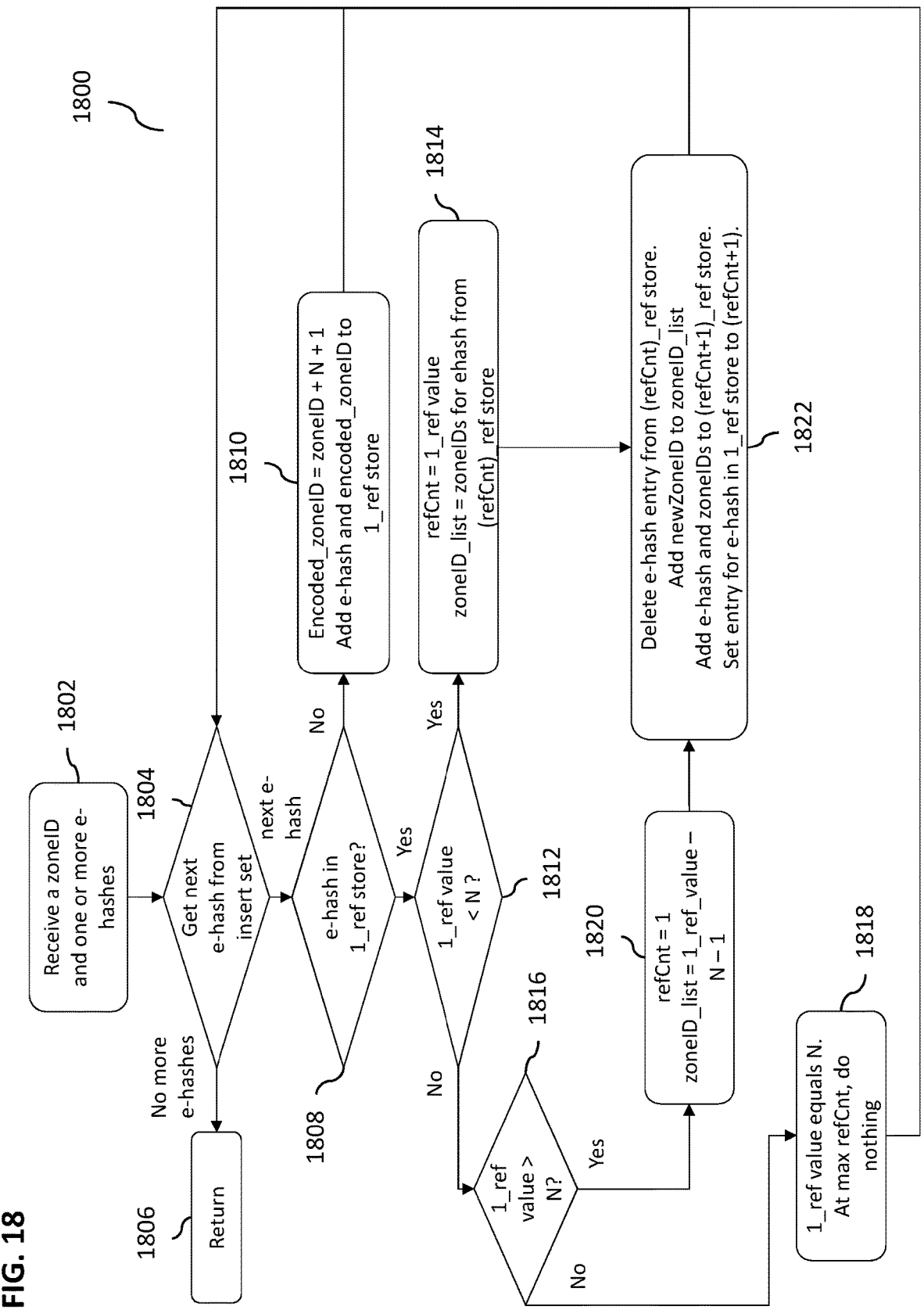
FIG. 18 illustrates an exemplary process for executing an insert function (for example, using the in-memory structure shown in FIG. 15), according to some implementations of the current subject matter.

FIG. 18 illustrates an exemplary process 1800 for executing an insert function, according to some implementations of the current subject matter. The process 1800 may, for example, be executed using the structure 1500 shown in 1500. At 1802, a zoneID and one or more e-hashes may be received for the purposes of executing the insert function. The process 1800 may be repeated for each e-hash contained in the set of insert data. In particular, the process 1800 may be configured to repeat through all e-hashes for a zoneID that is sought to be inserted.

At 1804, for each received e-hash, the process 1800 may be configured to look up the e-hash in the 1_ref store, at 1808 (similar to operation 1704 in FIG. 17). If there are no entries, then the second-tier catalog does not include any entries for the received e-hash. As can be understood, the second-tier catalog, as used herein, is referred to for ease of illustration only and is not intended to limit the scope of the current subject matter, which may be used in connection with any type of catalog, virtual schema, data structure, data store, etc. In that case, the corresponding zoneID value may be encoded, as described above, by adding N+1 to it. The e-hash and its encoded zoneID may then be inserted in the 1_ref store, at 1810.

However, if there is an entry in the 1_ref store, the value for the e-hash may be checked to determine if it is less than the predetermined value of N, at 1812. If the value for that e-hash is less than N, the value may correspond to the current reference count for that e-hash. The processing may then proceed to 1814, where a refCnt may be assigned to this value and a list of zoneIDs may be ascertained from the (refCnt)_ref store. The e-hash entry may then be deleted from the (refCnt)_ref store, new zoneID may be added to the zoneID list, and the e-hash and zoneID list may be added to the (refCnt+1) ref store, where the entry for that e-hash in the 1_ref store may be set to (refCnt+1), at 1822.

Otherwise, if the 1_ref value is less than N, then the process 1800 may proceed to 1816, where a determination may be made whether the 1_ref value is greater than N. If the value is greater than N, then the current reference count is 1 (i.e., the refCnt is set to 1 (refCnt=1)) and the 1_ref value may correspond to an encoded zoneID, at 1820. A (N+1) value may then be subtracted from the 1_ref value, whereby the resulting value is assigned as the only entry in the zoneID list. The processing then proceeds to 1822, as described above.

Returning to 1816, if the 1_ref value is neither greater than nor less than N, then it may be equal to N, at 1818. In this case, it may be determined that the e-hash already has the maximum zoneID referrers allowed, and no further action may be executed for this e-hash. The processing again proceeds to 1822. Further, as stated above, the process 1800 may be repeated for each next e-hash that has been received as part of the insert. If no e-hashes are left, the process 1800 terminates, at 1806.

Figure 19:
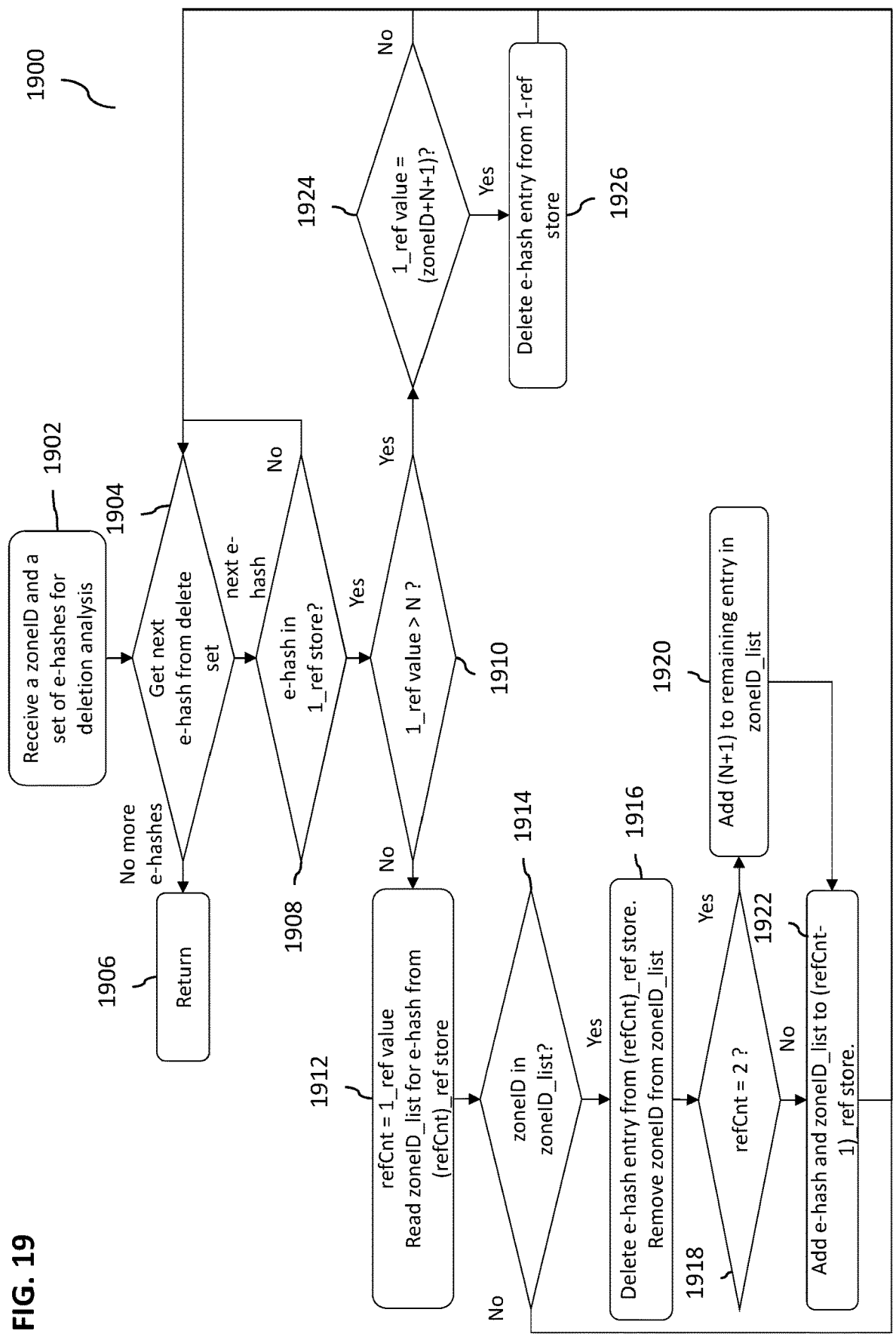
FIG. 19 illustrates an exemplary process for executing a delete function (for example, using the in-memory structure shown in FIG. 15), according to some implementations of the current subject matter.

FIG. 19 illustrates an exemplary process 1900 for executing a delete function, according to some implementations of the current subject matter. The process 1900 may, for example, be executed using the structure 1500 shown in FIG. 15. At 1902, a zoneID and a set of e-hashes that it references may be received for the purposes of deletion. Similar to the execution of the insert function 1800, the delete function 1900 may be configured to iterate through the received set of e-hashes. At 1904, the next e-hash from the received set of e-hashes is retrieved for deletion analysis. If there are no more e-hashes (e.g., after the process 1900 may have been repeated several times), the process terminates, at 1906.

At 1904, for each received e-hash, the process 1900 may be configured to look up and/or retrieve the e-hash in the 1_ref store, at 1908 (similar to operation 1704 shown in FIG. 17 and operation 1804 shown in FIG. 18). If there are no entries, no further processing is performed in connection with that e-hash.

However, if the e-hash is contained in the 1_ref store, at 1908, the e-hash's 1_ref value may be compared to a predetermined value of N to determine whether it is greater than N, at 1910. If it is greater, then the 1_ref value may be compared to zoneID+N+1 to determine if it equals to it, at 1924. If not, then this e-hash may have already been deleted for this zoneID and no further action may be performed for this e-hash, whereby the process 1900 may return to 1904 to retrieve a next e-hash for deletion analysis. However, if at, 1924, the 1_ref value of the e-hash equals to zoneID+N+1, then the entire entry for that e-hash may be deleted from the 1_ref store, at 1926.

If the 1_ref value is not greater than N, at 1910, then the refCnt may be set to the 1_ref value and the list of zoneIDs may be read from the store entry for the e-hash in the (refCnt) ref store, at 1912. The zoneID list may be checked to determine whether it contains the zoneID being requested for deletion, at 1914. If not, then this e-hash may have already been deleted for this zoneID and no further processing may be performed for this e-hash, whereby the process 1900 may again return to 1904 to retrieve a next e-hash for analysis, if any.

However, if the zoneID is contained in the zoneID list, then the e-hash entry may be deleted from the (refCnt) ref store and the zoneID may be removed from the zoneID list, at 1916. The process 1900 may then continue to 1918, where refCnt value may be checked to determine whether it equals to 2. If so, it may mean that the reference count for this e-hash is going down to 1, and thus, the remaining zoneID in the list may need to be encoded for insertion in the 1_ref store, at 1920, whereby N+1 may be added to the remaining zoneID in the list.

If the refCnt is not equal to 2, or once the encoding is complete (at 1920), the e-hash and its list with the outgoing zoneID removed may be added to the (refCnt−1) ref store, at 1922. Once an e-hash is processed, the process 1900 may loop back to retrieve and process the next e-hash, 1904.

FIG. 20 illustrates an exemplary chart 2000 illustrating comparison of conventional systems (discussed above) to the current subject matter system. The systems were being evaluated using N=100 with same test data set on a system with a 4.2 GHz i7-7700K Intel CPU, using the following three parameters: increase in memory consumption, random lookup performance times, and insert performance times. As shown in the chart 2000, the current subject matter's system outperforms existing systems, whereby memory use increase from up to 6.67:1 to 1.58:1 for the current subject matter system, thereby showing memory savings of up to 75%. Further, random lookup performance times were reduced from 1050 ns to 57 ns (an improvement of 18 times) and insert performance times were reduced from 1240 ns to 644 ns (an improvement of 1.9 times).

In some implementations, the current subject matter is advantageous to some of the existing system. For example, the current subject matter, as described above, is using a plurality of fixed length containers (e.g., N containers, where N may be any small number, such as, approximately 100 (although any number may be used)) rather than using one storage container having a variable length. Variable length containers (as for example is shown in FIG. 10) may use additional metadata, thereby consuming additional memory. With the plurality of fixed length containers, substantially less metadata is required, thereby causing a reduction in memory consumption. Moreover, the current subject matter allows encoding of e-hashes and zoneIDs for storage in the fixed length containers, where the first container (e.g., 1 container) may include both all length of 1 entries as well as lengths of X containers (X>1), which may be used to determine which container to go to if a received e-has is greater than 1_ref. This further reduces memory consumption as well as access times.

Figure 21:
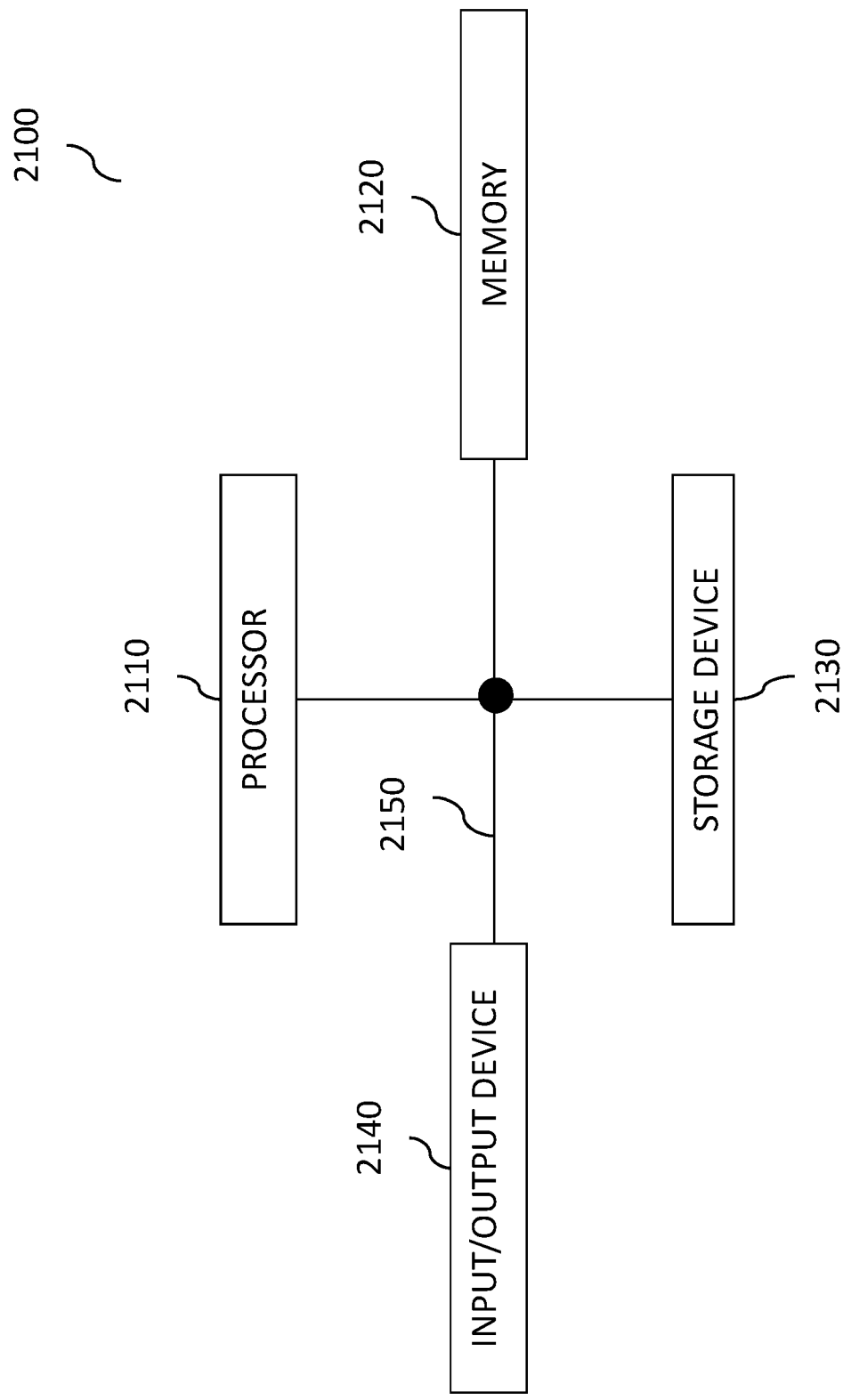
FIG. 21 illustrates an exemplary system, according to some implementations of the current subject matter.

In some implementations, the current subject matter can be configured to be implemented in a system 2100, as shown in FIG. 21. The system 2100 can include a processor 2110, a memory 2120, a storage device 2130, and an input/output device 2140. Each of the components 2110, 2120, 2130 and 2140 can be interconnected using a system bus 2150. The processor 2110 can be configured to process instructions for execution within the system 2100. In some implementations, the processor 2110 can be a single-threaded processor. In alternate implementations, the processor 2110 can be a multi-threaded processor. The processor 2110 can be further configured to process instructions stored in the memory 2120 or on the storage device 2130, including receiving or sending information through the input/output device 2140. The memory 2120 can store information within the system 2100. In some implementations, the memory 2120 can be a computer-readable medium. In alternate implementations, the memory 2120 can be a volatile memory unit. In yet some implementations, the memory 2120 can be a non-volatile memory unit. The storage device 2130 can be capable of providing mass storage for the system 2100. In some implementations, the storage device 2130 can be a computer-readable medium. In alternate implementations, the storage device 2130 can be a floppy disk device, a hard disk device, an optical disk device, a tape device, non-volatile solid state memory, or any other type of storage device. The input/output device 2140 can be configured to provide input/output operations for the system 2100. In some implementations, the input/output device 2140 can include a keyboard and/or pointing device. In alternate implementations, the input/output device 2140 can include a display unit for displaying graphical user interfaces.

Figure 22:
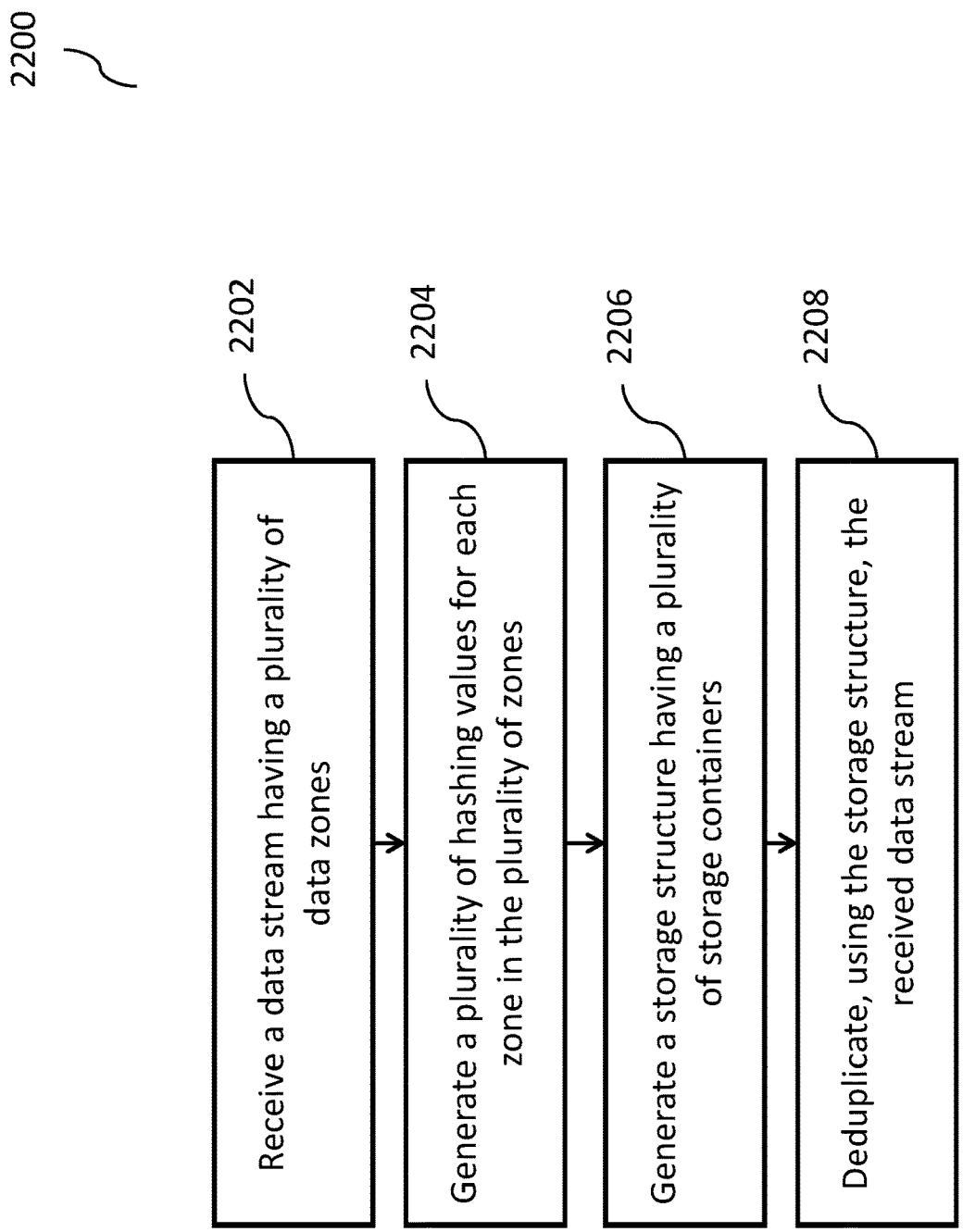
FIG. 22 illustrates an exemplary method, according to some implementations of the current subject matter.

FIG. 22 illustrates an exemplary process 2200 for performing accelerated and memory efficient similarity matching, according to some implementations of the current subject matter. At 2202, a data stream having a plurality of data zones may be received. Each zone may include a zone identifier (zoneID generated as described above). At 2204, a plurality of hashing values (e-hashes) for each zone in the plurality of zones may be generated. Each hashing value in the plurality of hashing values may be generated based on a portion of a zone in the plurality of zones. At 2206, a in-memory or a storage structure (e.g., a catalog, as shown in FIGS. 15-16) having a plurality of storage containers (1512-1520) may be generated. Each storage container in the plurality of storage containers may store one or more hashing values in the plurality of hashing values associated with each respective storage container and a plurality of zone identifiers referencing the associated one or more hashing values. At least one storage container (e.g., container 1512) may include a listing of zone identifiers stored in each storage container in the plurality of storage containers. At 2208, using the in-memory or a storage structure, the received data stream may be deduplicated.

In some implementations, the current subject matter can include one or more of the following optional features. Each container may be configured to store a metadata (e.g., metadata 1501-1509) identifying each one of the one associated one or more hashing values.

In some implementations, each plurality of zone identifiers stored in each storage container in the plurality of containers may be a fixed number of zone identifiers (e.g., X). Further, the plurality of storage containers may be a predetermined number of storage containers (e.g., N).

In some implementations, each container may be configured to store a zone identifier data determined based on the zone identifier referencing the associated one or more hashing for that container and the predetermined number of storage containers.

In some implementations, the method 2200 may include retrieving a zone identifier in the plurality of zone identifiers referencing a hashing value in the plurality of hashing values. The retrieval (as described above with regard to FIG. 17) may be performed based on the listing of zone identifiers stored in each storage container in the plurality of storage containers and a number of storage containers.

In some implementations, the method may also include inserting a new zone identifier and a new corresponding hashing value referencing the new zone identifier. The insertion (e.g., as described above with regard to FIG. 18) may be performed based on a determination whether the new corresponding hashing value is stored in one or more storage containers in the plurality of storage containers. Upon determination that the new corresponding hashing value is not stored in the one or more storage containers, the new zone identifier and the new corresponding hashing value may be encoded using a number of storage containers and stored in at least one storage container. Upon determination that the new corresponding hashing value is stored in the one or more storage containers, the new zone identifier may be encoded using the number of storage containers and stored in the storage container storing the new corresponding hashing value.

In some implementations, the method may include deleting a zone identifier in the plurality of zone identifiers referencing a hashing value in the plurality of hashing values. The deletion (e.g., as described in connection with FIG. 19) may be performed based on the listing of zone identifiers and hashing values stored in each storage container in the plurality of storage containers and a number of storage containers.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:
receiving a data stream having a plurality of data zones, wherein each zone includes a zone identifier;
generating a plurality of hashing values for each zone in the plurality of zones, wherein each hashing value in the plurality of hashing values is generated based on a portion of a zone in the plurality of zones;
generating a storage structure having a plurality of storage containers, each storage container in the plurality of storage containers storing one or more hashing values in the plurality of hashing values associated with each respective storage container and a plurality of zone identifiers referencing the associated one or more hashing values, wherein at least one storage container including a listing of zone identifiers stored in each storage container in the plurality of storage containers; and
deduplicating, using the storage structure, the received data stream;
wherein
each container is configured to store a metadata identifying each one of the one associated one or more hashing values;
each plurality of zone identifiers stored in each storage container in the plurality of containers is a fixed number of zone identifiers;
the plurality of storage containers is a predetermined number of storage containers.

2. The method according to claim 1, wherein each container is configured to store a zone identifier data determined based on the zone identifier referencing the associated one or more hashing for that container and the predetermined number of storage containers.

3. The method according to claim 1, further comprising retrieving a zone identifier in the plurality of zone identifiers referencing a hashing value in the plurality of hashing values.

4. The method according to claim 3, wherein the retrieving is performed based on the listing of zone identifiers stored in each storage container in the plurality of storage containers and a number of storage containers.

5. The method according to claim 1, further comprising inserting a new zone identifier and a new corresponding hashing value referencing the new zone identifier.

6. The method according to claim 5, wherein the inserting is performed based on a determination whether the new corresponding hashing value is stored in one or more storage containers in the plurality of storage containers;

wherein
upon determination that the new corresponding hashing value is not stored in the one or more storage containers, the new zone identifier and the new corresponding hashing value are encoded using a number of storage containers and stored in at least one storage container;
upon determination that the new corresponding hashing value is stored in the one or more storage containers, the new zone identifier is encoded using the number of storage containers and stored in the storage container storing the new corresponding hashing value.

7. The method according to claim 1, further comprising deleting a zone identifier in the plurality of zone identifiers referencing a hashing value in the plurality of hashing values.

8. The method according to claim 7, wherein the deleting is performed based on the listing of zone identifiers and hashing values stored in each storage container in the plurality of storage containers and a number of storage containers.

9. A system, comprising:
at least one programmable processor; and
a non-transitory machine-readable medium storing instructions that, when executed by the at least one programmable processor, cause the at least one programmable processor to perform operations comprising:
receiving a data stream having a plurality of data zones, wherein each zone includes a zone identifier;
generating a plurality of hashing values for each zone in the plurality of zones, wherein each hashing value in the plurality of hashing values is generated based on a portion of a zone in the plurality of zones;
generating a storage structure having a plurality of storage containers, each storage container in the plurality of storage containers storing one or more hashing values in the plurality of hashing values associated with each respective storage container and a plurality of zone identifiers referencing the associated one or more hashing values, wherein at least one storage container including a listing of zone identifiers stored in each storage container in the plurality of storage containers; and
deduplicating, using the storage structure, the received data stream;
wherein
each container is configured to store a metadata identifying each one of the one associated one or more hashing values;
each plurality of zone identifiers stored in each storage container in the plurality of containers is a fixed number of zone identifiers;
the plurality of storage containers is a predetermined number of storage containers.

10. The system according to claim 9, wherein each container is configured to store a zone identifier data determined based on the zone identifier referencing the associated one or more hashing for that container and the predetermined number of storage containers.

11. The system according to claim 9, wherein the operations further comprise retrieving a zone identifier in the plurality of zone identifiers referencing a hashing value in the plurality of hashing values.

12. The system according to claim 11, wherein the retrieving is performed based on the listing of zone identifiers stored in each storage container in the plurality of storage containers and a number of storage containers.

13. The system according to claim 9, wherein the operations further comprise inserting a new zone identifier and a new corresponding hashing value referencing the new zone identifier.

14. The system according to claim 13, wherein the inserting is performed based on a determination whether the new corresponding hashing value is stored in one or more storage containers in the plurality of storage containers;
wherein
upon determination that the new corresponding hashing value is not stored in the one or more storage containers, the new zone identifier and the new corresponding hashing value are encoded using a number of storage containers and stored in at least one storage container;
upon determination that the new corresponding hashing value is stored in the one or more storage containers, the new zone identifier is encoded using the number of storage containers and stored in the storage container storing the new corresponding hashing value.

15. The system according to claim 9, wherein the operations further comprise deleting a zone identifier in the plurality of zone identifiers referencing a hashing value in the plurality of hashing values.

16. The system according to claim 15, wherein the deleting is performed based on the listing of zone identifiers and hashing values stored in each storage container in the plurality of storage containers and a number of storage containers.

17. A computer program product comprising a non-transitory machine-readable medium storing instructions that, when executed by at least one programmable processor, cause the at least one programmable processor to perform operations comprising:
receiving a data stream having a plurality of data zones, wherein each zone includes a zone identifier;
generating a plurality of hashing values for each zone in the plurality of zones, wherein each hashing value in the plurality of hashing values is generated based on a portion of a zone in the plurality of zones;
generating a storage structure having a plurality of storage containers, each storage container in the plurality of storage containers storing one or more hashing values in the plurality of hashing values associated with each respective storage container and a plurality of zone identifiers referencing the associated one or more hashing values, wherein at least one storage container including a listing of zone identifiers stored in each storage container in the plurality of storage containers; and
deduplicating, using the storage structure, the received data stream;
wherein
each container is configured to store a metadata identifying each one of the one associated one or more hashing values;
each plurality of zone identifiers stored in each storage container in the plurality of containers is a fixed number of zone identifiers;
the plurality of storage containers is a predetermined number of storage containers.

18. The computer program product according to claim 17, wherein each container is configured to store a zone identifier data determined based on the zone identifier referencing the associated one or more hashing for that container and the predetermined number of storage containers.

19. The computer program product according to claim 17, wherein the operations further comprise retrieving a zone identifier in the plurality of zone identifiers referencing a hashing value in the plurality of hashing values.

20. The computer program product according to claim 19, wherein the retrieving is performed based on the listing of zone identifiers stored in each storage container in the plurality of storage containers and a number of storage containers.

21. The computer program product according to claim 17, wherein the operations further comprise inserting a new zone identifier and a new corresponding hashing value referencing the new zone identifier.

22. The computer program product according to claim 21, wherein the inserting is performed based on a determination whether the new corresponding hashing value is stored in one or more storage containers in the plurality of storage containers;

wherein
upon determination that the new corresponding hashing value is not stored in the one or more storage containers, the new zone identifier and the new corresponding hashing value are encoded using a number of storage containers and stored in at least one storage container;
upon determination that the new corresponding hashing value is stored in the one or more storage containers, the new zone identifier is encoded using the number of storage containers and stored in the storage container storing the new corresponding hashing value.

23. The computer program product according to claim 17, wherein the operations further comprise deleting a zone identifier in the plurality of zone identifiers referencing a hashing value in the plurality of hashing values.

24. The computer program product according to claim 23, wherein the deleting is performed based on the listing of zone identifiers and hashing values stored in each storage container in the plurality of storage containers and a number of storage containers.

* * * * *